(12) United States Patent
Kinoshita et al.

(10) Patent No.: US 7,883,254 B2
(45) Date of Patent: Feb. 8, 2011

(54) LIGHT GUIDE PLATE, PRODUCTION METHOD THEREFOR, AND SURFACE LIGHT SOURCE DEVICE PROVIDED WITH IT

(75) Inventors: Seiji Kinoshita, Tsukuba (JP); Yukihiro Yanagawa, Kamisu (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/659,508

(22) PCT Filed: Aug. 5, 2005

(86) PCT No.: PCT/JP2005/014414

§ 371 (c)(1),
(2), (4) Date: Sep. 6, 2007

(87) PCT Pub. No.: WO2006/013969

PCT Pub. Date: Feb. 9, 2006

(65) Prior Publication Data

US 2008/0130316 A1    Jun. 5, 2008

(30) Foreign Application Priority Data

Aug. 6, 2004  (JP) .............................. 2004-231005
May 24, 2005  (JP) .............................. 2005-150783

(51) Int. Cl.
*F21V 7/04* (2006.01)
(52) U.S. Cl. ........................ 362/615; 362/617; 362/621; 362/626; 362/620; 349/65
(58) Field of Classification Search ................. 362/617, 362/619, 620, 615, 623, 625, 626; 385/146; 349/65, 62

See application file for complete search history.

(56) References Cited

U.S. PATENT DOCUMENTS 5,600,455 A * 2/1997 Ishikawa et al. .............. 349/57

(Continued)

FOREIGN PATENT DOCUMENTS

EP    544332 A1 *  6/1993

(Continued)

*Primary Examiner*—Robert J May
(74) *Attorney, Agent, or Firm*—Oblon, Spivak, McClelland, Maier & Neustadt, L.L.P.

(57) ABSTRACT

A light guide plate capable of omitting use of a directional sheet such as a prism sheet as much as possible and ensuring a viewing angle without decreasing brightness in the vertical direction. A light guide plate 1 is used for an edge-light surface illuminant device 10. The light guide plate comprises an emission plane 6, a bottom plane 7 facing the emission plane 6 and an incident end face 8 which enters light emitted from a primary light source 4 provided in a side face between the emission plane 6 and the bottom plane 7. Each of the emission plane 6 and the bottom plane 7 comprises a pattern having convex portions and/or concave portions formed at predetermined pitches. The pattern formed on the emission plane 6 is orthogonal to the incident end face 8 and also the pattern formed on the bottom plane 6 is parallel to the incident end face 8. The emission plane 6 or the bottom plane 7 comprises a trapezoidal convex portion 2 and a trapezoidal concave portion 3 which are alternately arranged. If a diffusion treatment is performed on the surface of each of the convex portions 2, the light guide plate which has reduced glare on the surface and has a superior surface quality can be obtained.

13 Claims, 8 Drawing Sheets

U.S. PATENT DOCUMENTS

| | | | |
|---|---|---|---|
| 5,999,685 A * | 12/1999 | Goto et al. | 385/146 |
| 6,215,936 B1 * | 4/2001 | Yoshikawa et al. | 385/133 |
| 6,259,854 B1 | 7/2001 | Shinji et al. | |
| 6,347,874 B1 * | 2/2002 | Boyd et al. | 362/628 |
| 6,644,823 B2 * | 11/2003 | Egawa et al. | 362/609 |
| 6,692,133 B2 * | 2/2004 | Katsu et al. | 362/620 |
| 2003/0034445 A1 | 2/2003 | Boyd et al. | |
| 2004/0125588 A1 | 7/2004 | Ho | |

FOREIGN PATENT DOCUMENTS

| | | |
|---|---|---|
| JP | 58196505 A * | 11/1983 |
| JP | 6 250025 | 9/1994 |
| JP | 8 194217 | 7/1996 |
| JP | 9 61631 | 3/1997 |
| JP | 9 81048 | 3/1997 |
| JP | 10-241431 | 9/1998 |
| JP | 10 282342 | 10/1998 |
| JP | 11 282388 | 10/1999 |
| JP | 2001 351420 | 12/2001 |
| JP | 2002 50219 | 2/2002 |
| JP | 2002 109925 | 4/2002 |
| JP | 2003 114432 | 4/2003 |
| JP | 2004 200072 | 7/2004 |
| WO | 02 08662 | 1/2002 |

* cited by examiner (a)

(b)

LIGHT GUIDE PLATE, PRODUCTION METHOD THEREFOR, AND SURFACE LIGHT SOURCE DEVICE PROVIDED WITH IT

TECHNICAL FIELD

The present invention relates to a light guide plate, which is used for an edge-light surface illuminant device, and a surface illuminant device having the same.

BACKGROUND

There has been widely spread a liquid crystal display device (liquid crystal display) with a built-in backlight. With such a liquid crystal display, light emitted from a surface illuminant device disposed in the backlight portion penetrates a liquid crystal display element; thereby, an image displayed on the liquid crystal display device becomes visible.

The above surface illuminant device disposed in the backlight portion includes two types, an edge-light surface illuminant device and a direct surface illuminant device. Since the edge-light surface illuminant device is provided with a primary light source disposed in a side face of a light guide plate, it is effective for thinning the surface illuminant device, compared with the direct surface illuminant device. Accordingly, the edge-light surface illuminant device has been widely used as a display portion such as a portable laptop computer and a monitor.

With the edge-light surface illuminant device, a panel made of a transparent resin or the like is used as the light guide plate. This light guide plate includes an incident end face provided with the primary light source such as a linear light source or a dot-light source between an emission plane and a bottom plane facing the emission plane. Moreover, white dots (scattered dots) are printed on the bottom plane, and the brightness distribution in the visual direction is adjusted to be uniformed by adjusting the size, density or the like of the dots. Thereby, the light emitted from the primary light source enters the light guide plate from the incident end face. This incident light is emitted toward the liquid crystal display element portion from the emission plane while being guided in the interior portion of the light guide plate.

Since the above surface illuminant device adopts the scattered dots for the light guide plate, the light right after the emission from the light guide plate includes light distribution diffused at a wide angle, and the light is not directed in the visual direction. Consequently, two prism sheets (directional sheets) which are orthogonal to each other are used for increasing the brightness by condensing the light emitted from the light guide plate in the visual direction.

However, the above conventional edge-light surface illuminant device requires two expensive prism sheets, resulting in an increase in the number of parts for disposing the prism sheets, and causing a problem which complicates the assembling of surface illuminant device.

In order to avoid the increase in the number of parts as described above, there has been proposed a method of directing light to be emitted from an emission plane in the visual direction by forming a prism on the emission plane, a bottom plane facing the emission plane or the like of a light guide plate (for example, reference to patent documents 1-3).

In the patent document 1, for example, there is proposed a light guide plate having an emission plane provided with convex portions (or a groove array of concave portions) which are perpendicular or incline with respect to an incident end face. With such a light guide plate, since the light introduced into the light guide plate is guided to the back of light guide plate, the prism sheets (directional sheet) for bottom laying, which are disposed such that the groove array is arranged in the perpendicular direction with respect to the incident end face, can be omitted. Moreover, according to the patent document 1, there is proposed that the two prism sheets can be omitted by crossing the above convex portions (or the groove array of concave portions).

In this case, the above convex portions (or the groove array of concave portions) can be formed by die making. For instance, the concave portions (or convex portions) each having a predetermined cross section are formed in a cavity plane of metal mold by marking off, and then the cavity plane having a mirror-like smooth and continuous concavity and convexity curved surface can be formed by performing electrochemical polishing.

Moreover, a prism optical element integrated light guide plate is disclosed in the patent documents 2 and 3. Such a prism optical element integrated light guide plate comprises an emission plane and a bottom plane each having V-shape groove array in the direction orthogonal to each other. Thereby, the light entered from an incident end face is introduced into the bottom plane to effectively reflect the reflection light in the emission plane direction. In addition, if the light is emitted from the emission plane via the prism formed on the emission plane, the incident light entered from the direction perpendicular to the incident end face can be emitted at an angle perpendicular to the emission plane or an angle close that angle.

Patent Document 1: JP H09-61631A (FIGS. 6, 8 and paragraph 0038).
Patent Document 2: JP H10-282342A
Patent Document 3: JP 2003-114432A

DISCLOSURE OF INVENTION

Problems to be Solved by the Invention

According to the light guide plate set forth in the patent document 1, there has been disclosed that the two directional sheets can be omitted by forming the convex portions or the concave portions with being crossed; however, as disclosed in the paragraph 0038, there is a problem that a certain level of divergent light is not avoidable. Therefore, according to the light guide plate set forth in the patent document 1, it is described that a new problem which complicates the structure of light guide plate is caused because the adjustment of crude density of white print dots or granulated dots is required.

Moreover, with the prism optical element integrated light guide plate set forth in the patent document 2 or 3, the convex portions or the concave portions formed on the emission plane or the bottom plane comprise the array provided with V-shape grooves each having a sharply-angled apex angle. The edge-light surface illuminant device using the prism optical element integrated light guide plate having the above array provided with V-shape grooves has a problem which narrows a viewing angle, in addition to the difficulty of light emission in the vertical direction (normal direction). In addition, in some cases, according to a viewing angle, since the contrasting of brightness is remarkable, there is a problem which deteriorates the surface quality by a dark line which becomes visible when viewing the corner portion of light guide plate from an angle, as well as emphasizes glare on the surface.

It is, therefore, a first object of the present invention to provide a light guide plate capable of omitting a directional sheet such as a prism sheet as much as possible, and ensuring a viewing angle without reducing brightness in the vertical direction.

In addition to the above object, it is an another object of the present invention to provide a light guide plate capable of improving a surface quality by controlling glare on a surface and preventing generation of a dark line.

Means for Solving the Problems

The present inventors have already filed a patent application for an invention of a method of manufacturing a micro structure having a trapezoidal shape in a cross-section of a light illumination portion, which has a plane having contact with a slit as an upper base and gradually decreases toward a light ray incident side (for example, reference to the specification of JP2004-115938). According to the prior invention, a photomask having slits opened at predetermined pitches is disposed to a resist layer formed on a substrate, and a parallel light ray is characteristically irradiated from a light source via the photomask. More particularly, according to the prior invention, the parallel light ray is entered with respect to the vertical plane along the longitudinal direction of the slit while changing an angle from one direction to the other direction in a continuous manner or a phased manner. By the characteristic irradiation which irradiates the parallel ray while changing the angle of parallel light ray, the micro structure having convex portions and/or concave portions each extending in the longitudinal direction is provided.

Moreover, according to the prior invention, it is disclosed that the shape and size of the micro structure can be freely and accurately controlled by appropriately adjusting the incident angle of parallel light ray, the measurement of each portion of the photomask, the type of resist layer and/or the thickness in the resist layer. Then, the micro structure that the adjacent V-grooves (concave portion or depression having triangle shape in cross-section) separate each other and the micro structure that the lower bases of trapezoidal convex portions (projections) separate each other are obtained. The latter micro structure has a pattern that a trapezoidal concave portion (groove, depression) with its upper base and lower base reversed with respect to the convex portion is arranged between the adjacent convex portions.

Furthermore, according to the prior invention, the microstructure having the above surface structure is applied for a stampa for molding. It is disclosed that a stampa for molding, which has a shape identical to the above micro structure or a reversed shape, is produced, and a molded body made of a transparent resin can be formed by using the stampas for molding.

Consequently, the present inventors considered the application of micro structure formed by the prior invention. As a result, the present inventors found out that the prism sheet could be omitted and the viewing angle could be secured without reducing the brightness in the vertical direction by alternately arranging the convex portions and the concave portions, and by disposing the trapezoidal convex portions and the trapezoidal concave portions on the emission plane or the bottom plane, or both of the emission plane and the bottom plane, in the light guide plate comprising a pattern having the convex portions and/or the concave portions formed at predetermined pitches on the emission plane and the bottom plane.

More particular, the present invention comprises a light guide plate including a pattern having convex portions and/or concave portions formed at predetermined pitches on each of an emission plane and a bottom plane facing the emission plane, the pattern formed on the emission plane is orthogonal to an incident end face and the pattern formed on the bottom plane is parallel to the incident end face, and at least in one plane of the emission plane and the bottom plane, each of the convex portions having a trapezoidal shape and each of the concave portions having a trapezoidal shape are alternately arranged.

Such a light guide plate is used for an edge-light surface illuminant device. In addition, such a surface illuminant device is disposed in a backlight portion of a liquid crystal display device.

EFFECT OF THE INVENTION

According to the light guide plate of the present invention, the light entered from the incident end plane is deflected by the pattern including the convex portions and/or the concave portions formed on the bottom plane, and the light is emitted from the convex portions and/or the concave portions formed on the emission plane orthogonal to the convex portions and/or the concave portions formed on the bottom plane. Accordingly, the use of prism sheet can be omitted. In this case, compared with the light emitted from the emission plane provided with the groove array having a sharp angle of apex angle, the decreases in the brightness in the vertical direction can be controlled and also the viewing angle can be increased by alternately arranging the trapezoidal convex portion and the trapezoidal concave portion on the emission plane or the bottom plane with the upper base and lower baser reversed each other.

Furthermore, when roughening the pattern provided with the trapezoidal shapes, the deterioration in the surface quality such as the glare on the surface and the generation of dark line can be prevented.

In addition, the present application is based on and claims priorities from Japanese application Nos. 2004-231005 and 2005-150783, the disclosures of which are hereby incorporated by references herein in their entirety.

DESCRIPTION OF REFERENCE NUMERALS

Figure 1:
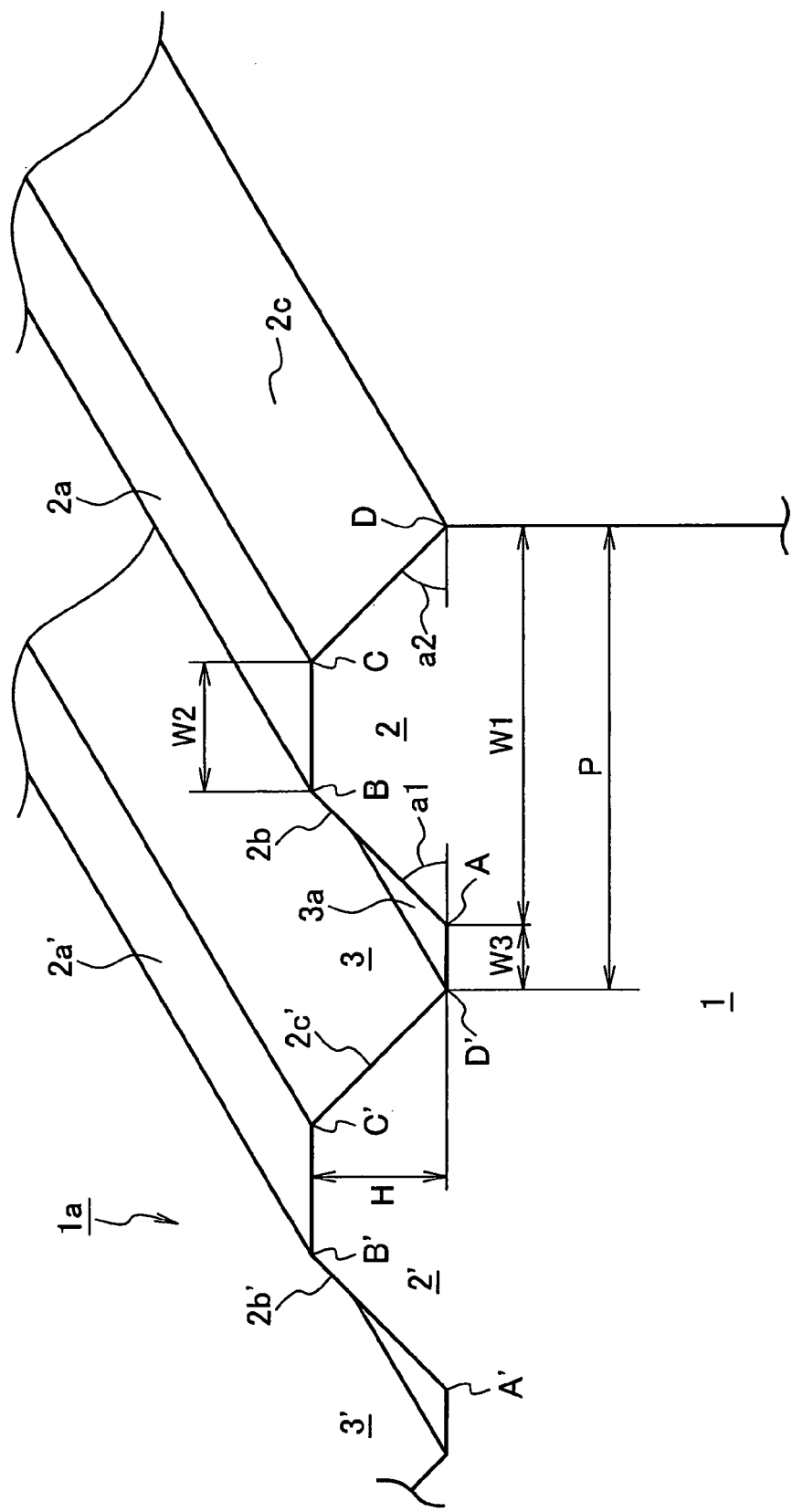
FIG. 1 A view explaining one surface of a light guide body according to the present invention.

1: Light guide plate
2: Convex portion
3: Concave portion
4: Primary light source
4a: Linear light source
4b: Reflector
5: Reflection sheet
6: Emission plane
7: Bottom plane
8: Incident end face (side face)
8a: Reflection end face (side face)
8b: Reflection end face (side face)
9: V-shape groove
10: Surface illuminant device
11: Substrate
12: Resist layer
12a: Illumination portion (exposure portion)
12b: Non-illumination portion (non-exposure portion)
13: Photomask
13a: Light shielding portion
13b: Slit
14: Master plate
15: Upper base
16a, 16b: Inclined face
17: Upper base
18: V-shape groove
19: Trapezoidal groove
20: Fine particle
20a: Convex part
21: Concave part

BEST MODE FOR CARRYING OUT THE INVENTION

Hereinafter, a best mode for carrying out the invention will be explained. In addition, for convenience of explanation, it is described by the drawings that a horizontal and vertical reduced size of each part is randomly changed.

First of all, a surface illuminant device according to the present invention comprises a light guide plate of tabular (panel shape) transparent structure which is made of a transparent resin or the like, a primary light source disposed in one side face of the light guide plate and a reflection sheet disposed in an under plane of the light guide plate.

Such a light guide body can be made of a transparent resin having a high light transmittance. As the transparent resin, for example, a methacrylic resin, an acrylate resin, a polycarbonate resin, a polyester resin, or a cyclic polyolefine resin can be widely adopted.

According to the present invention, the light guide body has an emission plane provided in one plane and a bottom plane facing the emission plane. Moreover, the light guide body has the primary light source at least in one side face, and this side face comprises an incident end face.

According to the present invention, at least one face is used as the incident end face, but a plurality of faces may be used as the incident end faces, respectively. When one face is used as the incident end face, other side faces in addition to the incident end face are used as reflection end faces, respectively.

According to a typical example when two incident end faces are used, a linear light source as the primary light source is disposed in each of the faces facing each other and a reflection end face is formed in each of the both side faces. Each of the two incident end faces is required to satisfy a condition which becomes orthogonal to a pattern formed on the emission plane and becomes parallel to a pattern formed on the bottom plane.

The primary light source is disposed toward the incident end face. Any kind of light source can be used as the primary light source, but a linear light source or a dotted light source is explained with an example. Moreover, the primary light source may comprise a linear light source in which a plurality of dotted light sources such as an LED light source is arranged.

According to the present invention, a pattern of convex portions and/or a pattern of concave portions, which are/is formed at predetermined intervals, respectively, are/is formed orthogonal to each other in both of the emission plane and the bottom plane of the light guide plate. Each of the convex portions and/or each of the concave portions include/includes a trapezoidal convex portion and a trapezoidal concave portion as described later, and may be substantially identical with or equal to the convex portion or the concave portion used in the conventional surface illuminant device.

Each of the convex portions and/or each of the concave portions are/is formed such that a convex (projection) part which projects in cross-section and/or a concave (groove) part which hollows in cross-section extend/extends in one direction. The cross-section shape of convex portion or the concave portion may comprise a predetermined shape such as a triangle, cuneiformis, other polygonal shape, wave shape or semielliptic shape.

Each of the convex portions or each of the concave portions is arranged at pitches within a range of generally less than or equal to 1000 μm, preferably less than or equal to 800 μm, more preferably 10 μm-600 μm or the most preferably about 20 μm-400 μm. As one example of the convex portion or concave portion, for example, when the cross section comprises a triangle groove, its apex angle is set within a range of 60°-120°, and the depth of the groove is set within a range of about 1 μm-100 μm. In addition, the mark "-" indicates a range including an upper limit thereof and a lower limit thereof. More particularly, for example "10 μm-600 μm" means more than or equal to 10 μm and less than or equal to 600 μm.

In this case, the convex portions and/or the concave portions formed on the emission plane may be arranged at uniform pitches and shapes, but the convex portions and/or the concave portions formed on the bottom plane may be arranged such that the interval decreases with distance from the primary light source, or the depth of groove and/or the height of projection gradually increase with distance from the primary light source. Moreover, each of the convex portions and/or each of the concave portions may be configured such that each of the shapes is gradually different with distance from the primary light source. The structure that each of the shapes is gradually different comprises a case that each of the apex angles is gradually different, for example. In each case, it is configured to control the structure of bottom plane such that the light bent by the bottom plane and the reflection sheet is emitted from the emission plane at predetermined strength. These adjustments are performed in combination of each other or in conjunction of another adjustment device.

According to the present invention, it is necessary for the emission plane or the bottom plane to have trapezoidal convex portions and trapezoidal concave portions which are alternately arranged with the upper base and lower base reversed. The emission plane and the bottom plane may be provided with the trapezoidal convex portions and concave portions.

In this case, the trapezoidal convex portion comprise a projection extending in the longitudinal direction, which is disposed in the surface side of the light guide plate to project in a trapezoidal shape from the surface side of the light guide plate, and the trapezoidal concave portion comprises a groove extending in the longitudinal direction, which is formed to hollow in a trapezoidal shape toward the light guide plate.

For example, in the light guide plate 1 illustrated n FIG. 1, a trapezoidal convex portion 2 having apexes A, B, C and D in cross-section and a trapezoidal convex portion 2' having apexes A', B', C' and D' in cross-section are disposed at intervals. Thereby, a trapezoidal concave portion 3 having apexes A, B, C' and D' is disposed between the convex portion 2 and the convex portion 2' with the upper base and lower base reversed.

Moreover, the trapezoidal shape according to the present invention is not limited to a proper trapezoid as shown in the drawings. As is clear from the explanation described later, the trapezoidal shape according to the present invention may include R portions (rounded portions) on the both side portions of the upper base or the lower base, for example, as long as the trapezoidal shape according to the present invention maintains a substantially trapezoidal shape. This R portion is manufactured by a manufacturing process of a fine structure with the aftermentioned photolithography. For example, shapes of angular both edges can be smoothed by appropriately heating a resin master plate. In addition, the terms "upper base" and "lower base" do not mean the up and down direction. The terms are only for the explanation. A short side is explained as "upper base" and a long side is explained as "lower base" in the parallel opposite sides of trapezoid.

Next, a function of the above trapezoidal pattern will be explained with reference to FIG. 1. At first, in FIG. 1, reference number W1 denotes a length of a straight line AD (width of lower base of convex portion 2), W2 denotes a length of a straight line BC (width of upper base 2a of convex portion 2), W3 denotes a length of a straight line AD' (width of upper base 3a of concave portion 3), H denotes a height of the convex portion 2 (or depth of concave portion 3), a1 denotes an angle between the straight line AD and the straight line AB (inclined face 2b), a2 denotes an angle between the straight line AD and the straight line DC (Inclined face 2c) and a pitch P denotes a length of a straight line DD'. The pitch P is equal to the sum of width W1 of the lower base of convex portion 2 (length of straight line AD) and the width W3 of upper base 3a of the concave portion 3, and also to the sum of width of upper base 2a of the convex portion 2 (length of straight line BC) and the width of lower base of concave portion 3 (length of straight line BC').

According the present invention, since the convex portion 2 comprises a trapezoidal shape in cross-section and is provided with the appropriate width W2, the brightness in the vertical direction (normal line direction) orthogonal to the emission plane in the brightness distribution emitted from the emission plane is increased, while the concave portion has a role of guiding the guide light entered from the incident end face to the center of guide light plate.

Moreover, according to the present invention, the concave portion 3 comprises a trapezoidal shape in cross-section and is provided with the predetermined width W3, similar to that of the above mentioned W2, the brightness in the vertical direction (normal line direction) orthogonal to the emission plane in the brightness distribution emitted from the emission plan is increased, while the concave portion has a role of guiding the guide light entered from the incident end face to the center of the guide light plate.

If the width W2 becomes too narrow and the contribution of inclined faces 2b, 2b becomes too big, it becomes difficult to fully achieve the effect which increases the brightness of the vertical direction.

Also, if the width W3 becomes too narrow and the contribution of inclined faces 2b, 2c becomes too big, it becomes difficult to fully achieve the effect which increases the brightness of the vertical direction.

At the same time, if the width W2 or the width W3 is set relatively wider with respect to the Inclined faces 2b, 2c, the contribution of Inclined faces 2b, 2c becomes relatively small, and the brightness in the vertical direction can be improved but a viewing angle narrows. Consequently, it becomes difficult to fully achieve the object which omits a directional sheet as much as possible and ensures a viewing angle without decreasing the brightness in the vertical direction by disposing periodical pattern of the convex portion or the concave portion in the emission plane.

According to the present invention, the shape, size and pitch P of the convex portion 2 or the concave portion 3 are determined in consideration of a relationship among the size of guide light plate 1, the display performance and specification of surface illuminant device and the like. Therefore, the brightness of light emitted from the emission plane of the light guide plate is appropriately maintained, and an appropriate viewing angle can be obtained.

A height H of the convex portion 2 (or concave portion 3) is selected within a general range of 1 $\mu$m-100 $\mu$m, within a more preferable range of 5 $\mu$m-50 $\mu$m or within the most preferable range of 10 $\mu$m-30 $\mu$m. In addition, the inclined angles a1, a2 are selected within a general range of 15-70° or within a more preferable range of 15°-60°. Especially, when emphasizing a viewing angle characteristic, the inclined angles a1, a2 are selected within the most preferable range of 15°-35°, and when emphasizing a brightness characteristic, the inclined angles are selected within the most preferable range of 35°-60°.

The width W1 of lower base is selected within a general range of 10 $\mu$m-500 $\mu$m, a more preferable range of 15 $\mu$m-270 $\mu$m, and the most preferable range of 15 $\mu$m-180 $\mu$m. Moreover, the width W2 of upper base is selected within a range of 1 $\mu$m-500 $\mu$m, a more preferably range of 1 $\mu$m-100 $\mu$m, and the most preferably range of 5 $\mu$m-50 $\mu$m. Furthermore, the width W3 is selected from a general range of 1 $\mu$m-500 $\mu$m, a more preferable range of 0.1 $\mu$m-300 $\mu$m and most preferably a range of 1 $\mu$m-150 $\mu$m.

According to a preferred embodiment of the present invention, the light guide plate 1 according to the present invention is characterized by the trapezoidal pattern which is formed with maintaining a specific ratio in relation to the width W1, W2, W3 to the pitch P.

More particularly, in the light guide plate 1 according the present invention, it is preferable for the ratio (W3/W2) of the width W3 of upper base formed in the concave portion 3 to the width W2 of upper base formed in the convex portion 2 to be within a range of 0.01-200, more preferably to be within a range of 0.02-100 and the most preferably to be within a range of 0.1-10. In addition, it is preferable for the ratio of (P−W2−W3) to (W2+W3) to be within a range of 0.04-400, more preferably to be within a range of 0.2-200 and the most preferably to be within a range of 0.3-150.

According to the present invention, by maintaining the ratio of W3 to W2 within these ranges, the brightness of light emitted from the emission plane of light guide plate 1 is appropriately maintained, and a condition for obtaining an appropriate viewing angle can be easily set.

In this case, if the ratio of W3 to W2 is within a range of 0.1-10, the directional sheet can be omitted because the brightness in the vertical direction is improved.

Moreover, if the ratio of (P−W2−W3) to (W2+W3) is within a range of 0.3-150, the directional sheet can be omitted because a viewing angle characteristic can be ensured while controlling the deterioration in the brightness in the vertical direction.

The trapezoidal pattern may comprise a mirror surface or a diffusing surface which is appropriately roughened. By roughening the surface, the glare on the surface in the liquid crystal display device can be controlled. In some cases, it is possible to prevent the generation of dark line which is caused when viewing the corner portion of light guide plate from an angle. Accordingly, the liquid crystal display has a superior surface quality.

Figure 4:
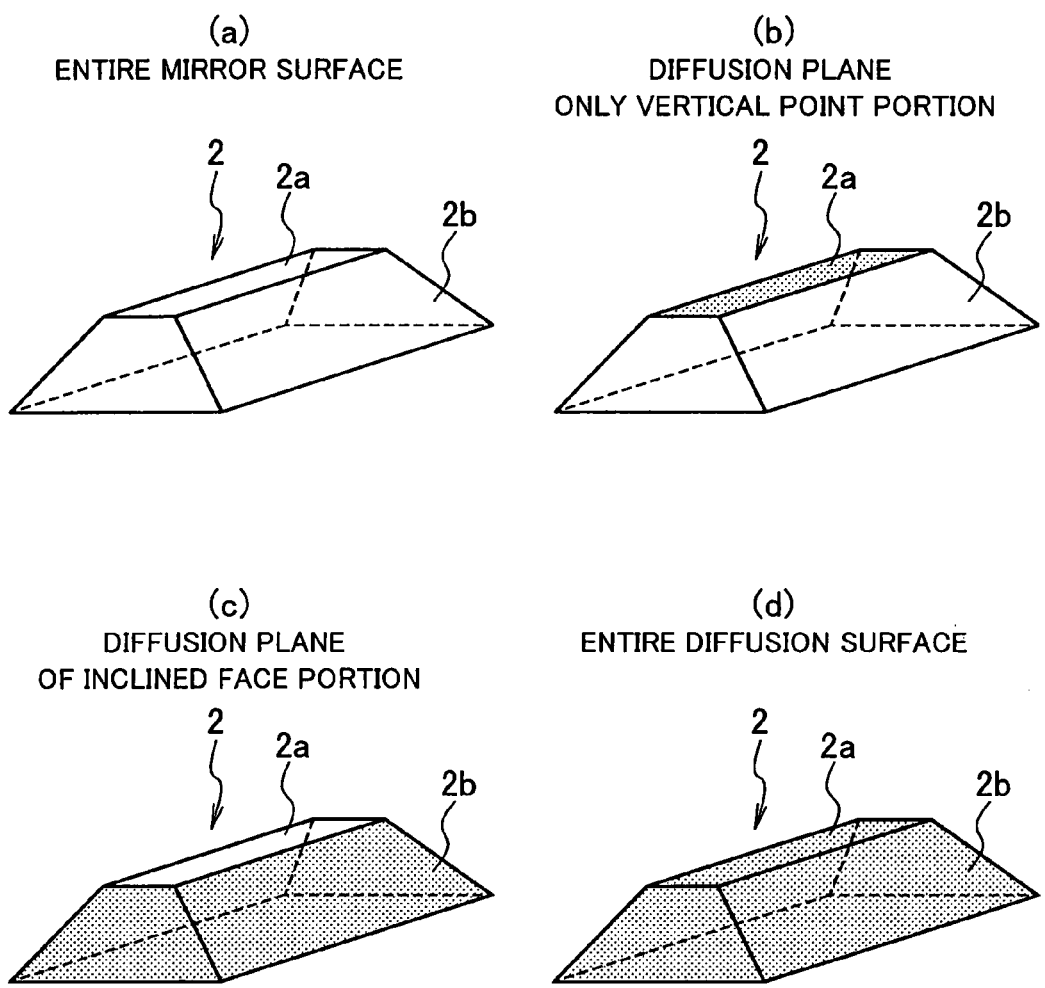
FIG. 4 A view describing a surface characteristic of convex portion having a trapezoidal shape disposed in an emission plane of light guide plate.

With this roughness, it is preferable for an arithmetic mean roughness (Ra) based on JIS B0601, for example, to be within a range of 0.1 μm-10 μm, more preferably within a range of 0.15 μm-5 μm, further preferably within a range of 0.2 μm-2 μm. Moreover, as shown in FIG. 4(b), only the upper base (zenith plane) 2a of the convex portion 2 may be roughened, but as shown in FIG. 4(d), the Inclined faces 2b and the zenith plane 2a may be roughened (entire diffusing plane). Further, as shown in FIG. 4(c), only the inclined portions (Inclined faces 2b) may be roughened. Furthermore, the upper base (zenith plane) 3a of the concave portion 3 may be roughened. The light emitted from the diffusing plane formed by roughening the surface is expected to improve the surface quality in each case.

Next, one example of each of the surface illuminant devices using the above light guide body 1 will be explained with reference to FIGS. 2, 3.

A surface illuminant device 10 comprises a light guide plate 1 of a tabular (panel shape) transparent structure made of a transparent resin such as an acrylate resin, a primary light source 4 disposed in the one side face of light guide plate 1 and a reflection sheet 5 disposed in the lower plane of light guide plate 1. The light guide plate 1 is provided with an emission plane 6 for emitting light on the top plane, and a bottom plane 7 is formed with respect to the emission plane 6.

Figure 2:
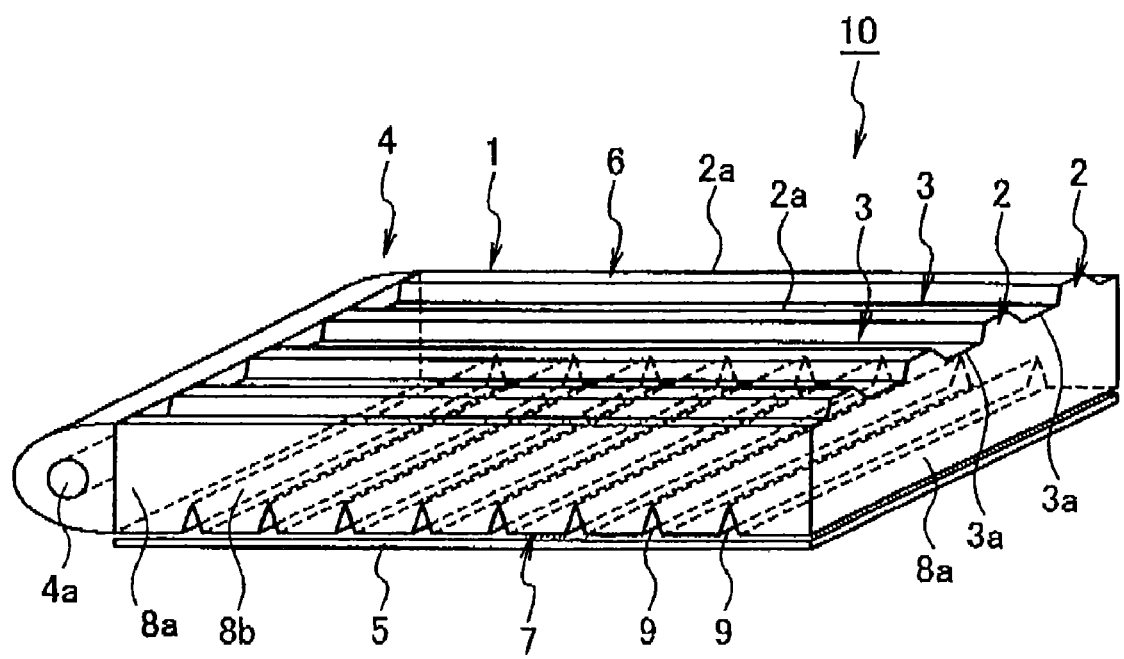
FIG. 2 A view illustrating one example of a surface illuminant device according to the present invention.

Here, in the surface illuminant device 10 illustrated in FIG. 2, a linear light source 4a is disposed in one side face of the light guide plate 1 which is adopted as an incident end face 8. In addition, the both side faces crossing to the incident end face 8 comprise a reflection end face 8b, and the plane facing the incident end face 8 comprises a reflection end face 8a.

Figure 3:
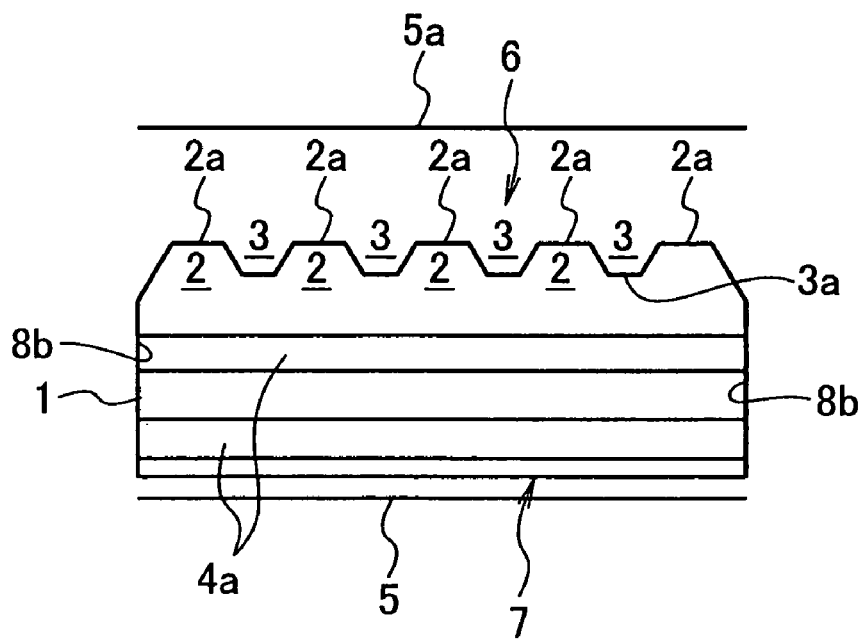
FIG. 3 A view illustrating one example of a surface illuminant device according to the present invention.
Figure 3:
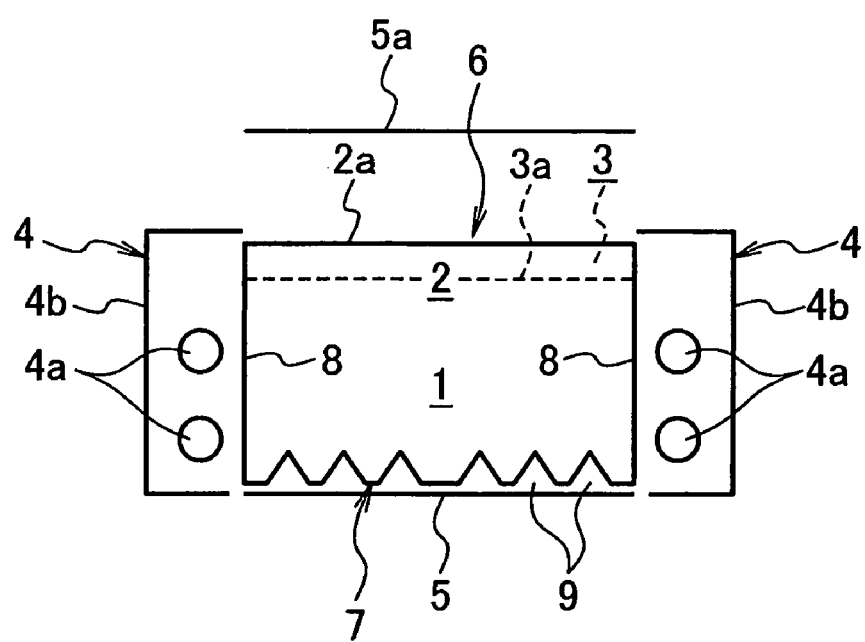

Moreover, a surface illuminant device shown in FIG. 3 is used to display a large liquid crystal display. Both side faces of an emission plane 6 and a base plane 7 are provided with primary light source 4, respectively, each of which is provided with a pair of linear light sources 4a in a reflector 4b. In order to fully secure light volume which enters the light guide body 1 from each of the linear light sources 4a, the thick light guide plate 1 is used. Accordingly, each of the side faces provided with the primary light source 4 is adopted as the incident end face 8, and each of the side faces crossing to the incident end face 8 is adopted as a reflection end face 8b. In the surface illuminant device shown in FIG. 3, a diffusing sheet 5a is disposed above the emission plane 6.

In either surface illuminant device shown in FIGS. 2, 3, a convex portion 2 having a trapezoidal shape in cross section and a concave portion 3 having a trapezoidal shape that its upper base and lower base are opposite to those of the convex portion 2 are alternately arranged in each of the emission planes 6. Those convex portion 2 and concave portion 3 are substantially similar to those on the surface 1a explained by FIG. 1; thus, the detailed explanation is omitted. Accordingly, the emission plane 6 is provided with a plurality of prisms each having a trapezoidal shape in cross section orthogonal to the incident end face 8.

Meanwhile, V-shape grooves 9 each having a triangle shape in cross section are arranged in the bottom plane 7 at predetermined pitch intervals parallel to the incident end face 8. The light volume distribution of light to be emitted from the emission plane can be adjusted by adjusting the pitch interval and size of V-shape groove 9.

The cross section shape of V-shape groove 9 is configured such that the apex angle is set within a general range of 60°-120°, within a more preferable range of 70°-115° and within the most preferable range of 80°-110°. The height thereof is set within a range of 1 μm-100 μm, within a more preferable range of 5 μm-50 μm and the most preferable range of 10 μm-30 μm. The pitch thereof is set within a range of 2 μm-800 μm, within a more preferable range of 10 μm-600 μm and within the most preferable range of 20 μm-400 μm.

Next, the surface illuminant device 10 as constructed above will be explained.

The light of linear light source 4a enters into the light guide plate 1 from the incident end face 8 of the light guide plate 1, and the light propagates in the longitudinal direction while repeating the total reflection between the emission plane 6 and the bottom plane 7.

Part of the light is guided toward the emission plane 6 by the V-shape grooves 9 formed on the bottom plane 7 and the reflection sheet 5, and is condensed by the prisms each having a trapezoidal shape in cross-section (convex portion 2 and concave portion 3) formed on the emission plane 6, and then is emitted within a desired viewing angle.

Compared with the prism of V-shape groove 9 formed on the emission plane 6, the deterioration in the brightness in the vertical direction is controlled and also the viewing angle is increased by forming the prim having a trapezoidal shape in cross-section on the emission plane 6.

As shown in FIG. 4(a), the trapezoidal prism comprises a mirror surface on the zenith plane (upper base) 2a and the Inclined face 2b, but these surfaces can be roughened.

For example, as illustrated in FIG. 4(c), if the Inclined face 2b of the trapezoidal prism (convex portion 2) is roughened, the viewing angle is increased, and also the glare on the surface as the surface illuminant device 10 and the dark line caused by viewing the corner portion of light guide plate from an angle and the like are controlled, so as to improve the surface quality, compared with the case that the mirror surface is formed on the entire surface as shown in FIG. 4(a).

Moreover, as shown in FIG. 4(d), if the enter surface of the zenith plane 2a and the Inclined face 2b of the trapezoidal prism (convex portion 2) is roughened, the surface brightness is slightly decreased, but the glare on the surface as the surface illuminant device, the dark line and the like are controlled, so as to further improve the surface quality, compared with the case that the Inclined face 2b is only roughened as shown in FIG. 4(c), thus, it is suitable for the surface illuminant device which emphasizes the viewing angle and the surface quality.

As described above, one example of the surface illuminant device was explained with reference to the drawings. However, according to the present invention, as long as a trapezoidal pattern is formed on either the emission plane 6 or the bottom plane 7 of the light guide plate 1, the following combinations are explained as preferred examples, for example, as the combinations of the prism pattern formed on the emission plane and the bottom plane 7 of the light guide plate 1 a) A combination of the emission plane having a trapezoidal pattern and the bottom plane having a V-shape concave pattern (V-shape groove).
b) A combination of the emission plane having a trapezoidal pattern and the bottom plane having a semiellipse concave pattern.
c) A combination of the emission plane having a V-shape concave pattern (V-shape groove) and the bottom plane having a trapezoidal pattern.
d) In the above combination a), the zenith plane of the trapezoidal pattern is roughened.
e) In the above combination a), the inclined face of trapezoidal pattern is roughened.
f) In the above combination a), the zenith plane and the inclined face of trapezoidal pattern are roughened.

Comparing the above combinations a)-c), the combination a) or b) is more preferable in terms of balance between the brightness feature and the viewing angle feature. Moreover, in terms of improvement in the surface quality, the combination that the plane is roughened such as d), e) or f) is preferable. In the conventional device, two diffusing sheets are used for improving the surface quality. However, with the above d), e) or f), the surface quality can be improved by the light guide body, so one or two diffusing sheets can be omitted, and the surface brightness can be improved by omitting the diffusing sheet.

Next, a method of manufacturing the above light guide plate will be described.

As long as the light guide plate according to the present invention comprises the above features, the method of manufacturing a light guide plate is not limited to the following method. Hereinafter, the method of manufacturing a light guide plate according to the present invention will be explained.

Generally, when mass-producing the light guide plate as in the present invention, it is often produced by injection molding using a metal mold. When manufacturing the metal mold, a method of cutting an insert to be incorporated into the metal mold by a diamond turning tool can be used.

However, in case of the above combinations a), c), d), e) and f), since the combination of the trapezoidal pattern and the V-shape groove is used for the surfaces, a photolithography method that the present inventors have previously applied can be used. A micro structure having a desired shape is produced by the photolithography method, and an electrocasting metal thin plate referred to as a stampa formed by the micro structure is attached to metal cavity planes on a movable side and a fixed side; thereby, the light guide plate having a desired shape can be produced by the injection molding.

Next, a method of manufacturing a micro structure by means of the photolithography method as one example of a preferred manufacturing method according to the present invention and a method of using the micro structure as the stampa for manufacturing the light guide plate will be explained.

According to the method of manufacturing a micro structure by means of the photolithography, a parallel light ray is irradiated from a light source onto a resist layer formed on a substrate via a photomask having slits opened at predetermined pitches, and then the micro structure having grooves extending in the longitudinal direction, which are formed based on a light illumination portion or a non-light illumination portion by developing, is manufactured.

By entering the parallel light ray to the negative photoresist layer formed on the substrate via the photomask having the slits opened at predetermined pitches while changing an angle in a continuous manner or a phased manner to the zenith plane along the longitudinal direction of the slit from one direction to the other direction, the cross section shape of light illumination portion becomes a trapezoid which gradually tapers toward the light ray incident side and has a surface having contact with the slit as the upper base.

In addition, a photomask having slits opened at predetermined pitches is disposed with respect to a positive resist layer formed on a substrate at a predetermined space from the resist layer. The lower base or the vicinity thereof of the light illumination portion has contacts each other or is overlapped each other by entering the parallel light ray from the vertical direction of the photomask; thereby, the V-shape groove toward the substrate plane can be formed in the micro structure. The micro structure is adjusted to a predetermined shape by appropriately adjusting the size of each part of the photomask, the space between the photomask and the resist layer and/or the thickness in the resist layer.

Also, by appropriately adjusting the incident angle of parallel light ray, the size of each part of the photomask and/or the thickness in the resist layer, by separating the lower bases of trapezoidal light illumination portions adjacent each other, the trapezoidal groove forming the upper base toward the substrate surface can be formed in the micro structure. A desired trapezoidal pattern according to the present invention (the convex portion having a trapezoidal shape and the concave portion having a trapezoidal shape are alternately arranged with the upper base and lower base reversed) can be obtained by using the micro structure having the trapezoidal groove.

In this case, by dispersing particles in the above negative resist layer, these particles are exposed on the zenith plane and the inclined face in the developing process, and micro concave portions or convex portions can be formed on the zenith plane and the inclined face by remaining the particles or eliminating the particles. Accordingly, the zenith plane and the inclined face of the trapezoid can be roughened.

Moreover, if the positive resist is used as the particles, the positive resist is exposed on the zenith plane and the inclined face in the developing process. However, the micro structure having micro concave portions can be manufactured on the zenith plane and the inclined face by solving and eliminating the positive resist.

The micro structure as described above is directly used as the stampa or is used as the stampa by an ordinary method, and the stampa can be used for manufacturing the micro structure such as the light guide plate having the trapezoidal prism by resin molding.

Consequently, the light guide body according to the present invention can be mass-produced by attaching the upper and lower planes of the metal mold for manufacturing the light guide body to a desired metal mold.

Figure 5:
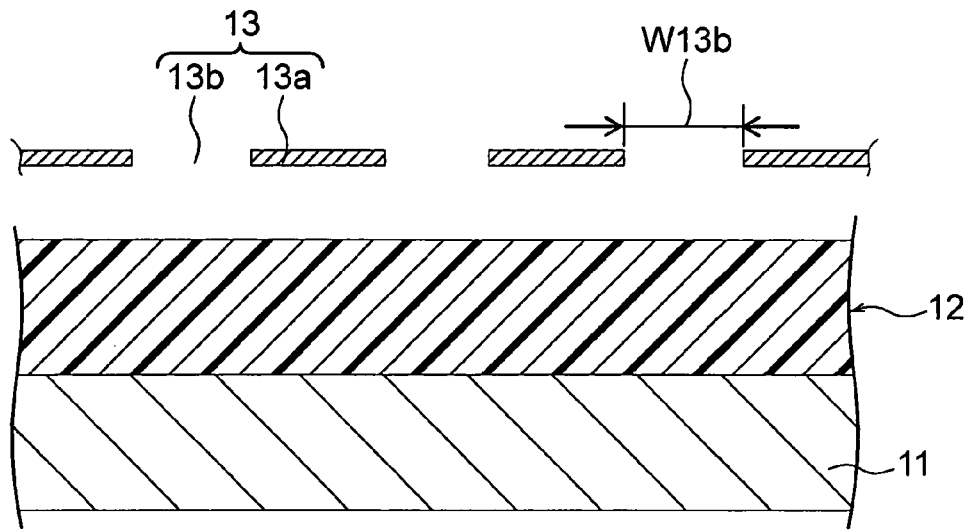
FIG. 5 A view showing a manufacturing process of master plate according to the present invention.
Figure 6:
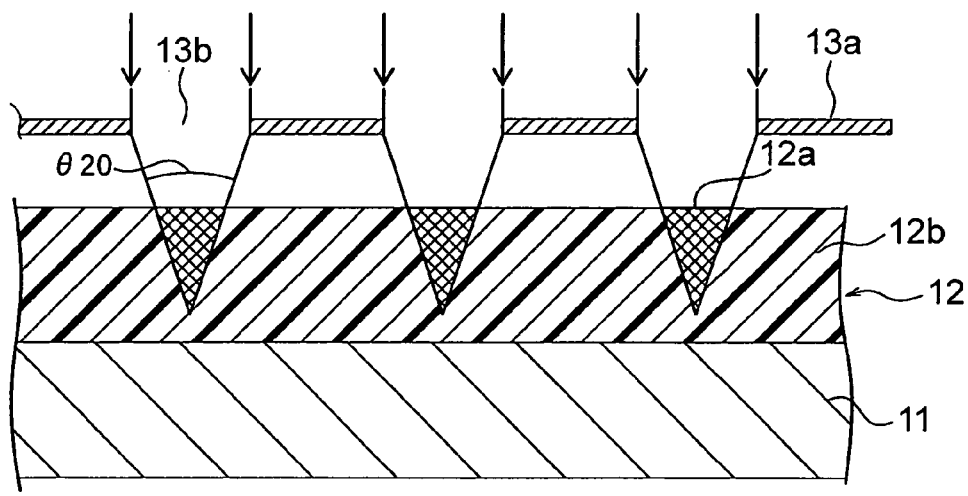
FIG. 6 A view showing a manufacturing process of master plate according to the present invention.
Figure 7:
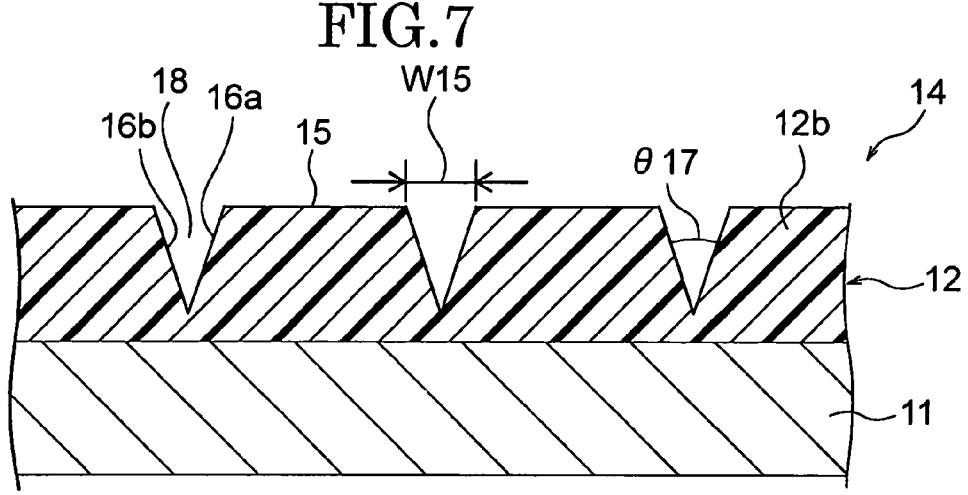
FIG. 7 A cross-section view illustrating one example of master plate to be obtained by the present invention.

Next, a best mode for a method of manufacturing the above micro structure will be described with reference to the drawings. At first, FIGS. 5, 6 are schematic views showing manufacturing steps for manufacturing the micro structure (stampa) using the V-shape grooves according to one embodiment of the present invention. FIG. 7 is a view explaining the shape of micro structure (master plate) obtained by the steps. Hereinafter, the present invention will be explained with reference to these drawings.

At first, as shown in FIG. 5, a resist layer 12 is formed on an appropriate substrate 11, and a photomask 13 is disposed above the upper plane of the resist layer 12 at predetermined space. The photomask 13 comprises a thin plate shape having light shielding portions 13*a* each of which reflects or absorbs light to shield the light and a plurality of slits (opening portion) 13b each of which is opened at a width W13b and is provided between the light shielding portions 13a.

Next, as shown in FIG. 6, a parallel light ray such as an ultraviolet light ray (UV light) is irradiated from the photomask 13 side. In this case, according to the present invention, the parallel light ray enters from the vertical direction of photomask 13.

A part of the resist layer 12 shown by reference number 12a is thereby exposed by the light ray irradiated from slit 13b to form an exposure portion 12a, and a part of resist layer 12 shown by reference number 12b is not exposed by the light ray to form a non-exposure portion 12b. The cross section shape of exposure portion 12a is thereby formed in an inverted triangle below the slit 13b. In this case, a bond angle θ20 is adjusted by controlling the space between the photomask and the resist layer. A trapezoid which gradually tapers toward the incident light ray side and has a surface facing the light shielding portion 13a as an upper base is formed between the exposure portions 12a, 12a adjacent each other.

In this case, since the resist comprises a positive resist, the exposure portion 12a is eliminated by separating the photomask after the exposure to develop the resist, and then a master plate 14 as a micro structure in which the non-exposure portion 12b is only remained can be obtained as shown in FIG. 7.

The master plate 14 is provided with a V-shape groove 18 having a width W15 narrower than the width W13b of the slit 13b and an apex angle θ17 between an inclined face 16a and an inclined face 16b facing each other, due to the elimination of light exposure portion 12a which has the same angle with the apex angle θ20 to be controlled by the space between the photomask and the resist layer.

Figure 8:
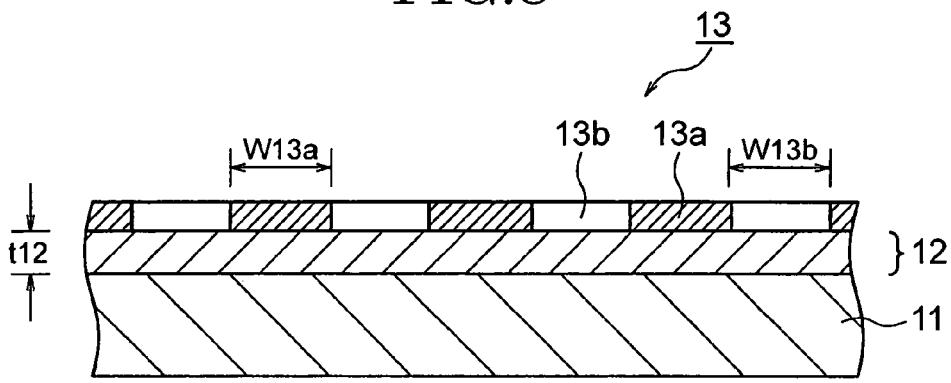
FIG. 8 A view showing a manufacturing process of master plate according to the present invention.
Figure 9:
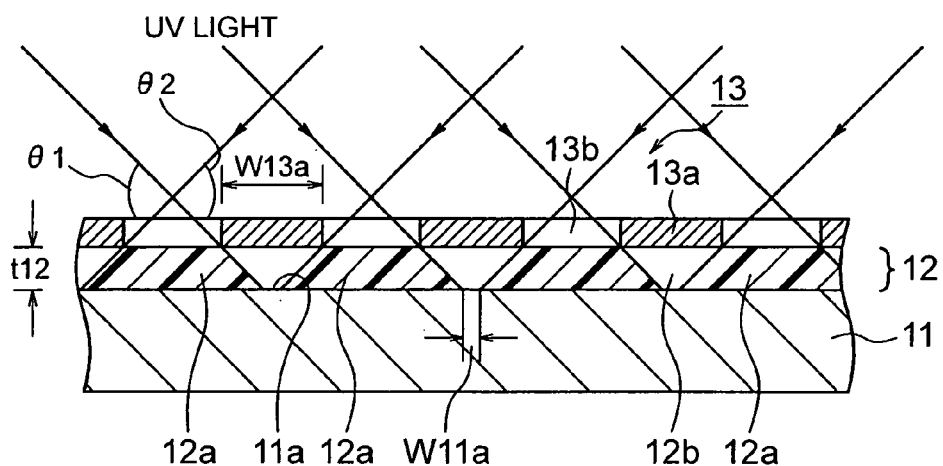
FIG. 9 A view showing a manufacturing process of master plate according to the present invention.
Figure 10:
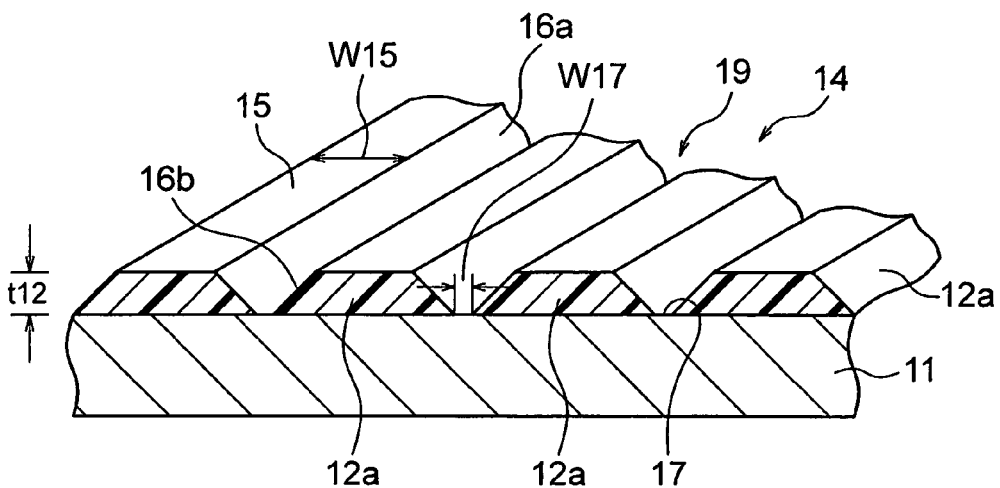
FIG. 10 A view illustrating one example of master plate to be obtained by the present invention.

FIGS. 8-10 are schematic views showing manufacturing steps of the master plate for manufacturing the micro structure (stampa) having the trapezoidal groove according to one embodiment of the present invention. The same reference numbers are used to refer to the same or like parts in FIGS. 5-7; thus, the detailed explanation will be omitted.

First of all, in the present embodiment, as shown in FIG. 8, it is configured to expand the width W13b in the slit 13b or to reduce the thickness t12 in the resist layer 12. As shown in FIG. 9, if the parallel light ray (UV light) is irradiated from the photomask 13 side, a clearance 11a indicated by a width W11a is formed between the exposure portions 12a, 12a adjacent each other by the expanded width W13b in the slit 13b or the reduced thickness t12 in the resist layer 12. In this case, since the resist comprises a negative resist, the non-exposure portion 12b is eliminated after developing. Accordingly, the master plate 14 that the adjacent exposure portions 12a, 12a are disposed at intervals to expose the substrate surface 17 can be obtained as shown in FIG. 10.

This master plate 14 comprises a trapezoid including the upper base 15 having the width 15 identical to the width W13b in the slit 13b, the inclined face 16b having an angle identical to an inclined angle of θ1, and the inclined face 16b having an angle identical to an inclined angle of θ2. A groove having an apex angle θ17 defined by θ1 and θ2 with the facing inclined faces 16a, 16b is formed, and this groove becomes a trapezoidal groove 19 having the upper base 17 which has a width W17 equal to the width W11a and is formed by exposing a part of the substrate 11.

The above trapezoidal groove 19 can be obtained by appropriately changing the illumination angle θ1, θ2 of the light ray, the width W13a in the light shielding portion 13a and the thickness t12 in the resist layer 12.

Next, each material for producing the above master plate 14 will be explained.

At first, a material of the substrate 11 is not limited. Any material can be used for the substrate as long as the material can support a photoresist and can be used for the later manufacturing process of the master plate. As a preferable substrate, for example, a planer material such as a glass substrate and a metal plate can be explained with an example.

In this case, since the master plate 14 illustrated in FIG. 10 comprises the trapezoidal grooves 19 each having the upper base 17 formed by exposing a part of the substrate 11, if a material having microasperity (surface roughness) is used for the substrate 11, the metal mold (stampa) manufactured by using the master plate 14 becomes a metal mold or stampa which recreates the microasperity (surface roughness) on the upper base 17. If the metal mold or the stampa to which a mater mold is transferred is produced by the metal mold or the stampa as the master mold, the trapezoidal pattern shown in FIG. 4(b) can be formed on the surface of light guide body as a molded object For example, if a material having a desired arithmetic mean roughness within a range of about 0.1 μm-2 μm is used for the substrate 11, the light guide plate having light diffuseness that the zenith plane 2a is roughened can be obtained as shown in FIG. 4(b).

Next, a resist material for forming the resist layer 12 will be explained. Any resist material such as a positive resist and a negative resist can be used as the resist material. However, the micro structure having the above V-shape grooves can be easily manufactured by using the positive resist.

Such a resist layer 12 can be applied by an appropriate method such as spin coat, spray coat or dip coat. Reasonable high viscosity of resist, for example, within a range of 50 mPa·s(cps)-400 mPa·s(cps) can equally maintain the thickness in the resist layer 12 within a range of 1 μm-100 μm. Generally, if the viscosity of resist is more than or equal to 100 mPa·s(cps), the resist layer 12 having a thickness more than or equal to 5 μm can be uniformly maintained. It is preferable to obtain such a thickness by the spin coat, but if the resist layer is applied by the spray coat, for example, an overspray method may be used.

In addition, a desired thickness in the resist layer 12 is determined, and the pattern of V-shape groove can be changed by reducing the thickness in the resist layer 12 as described above.

Figure 11:
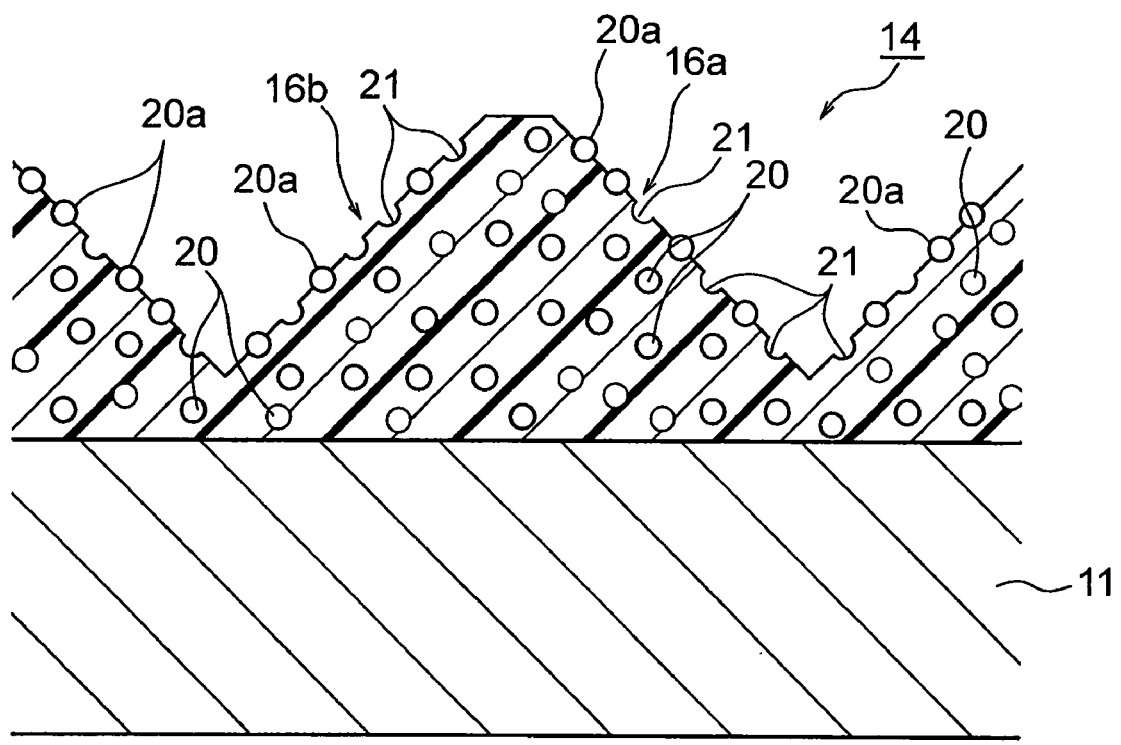
FIG. 11 A cross-section view illustrating one example of a master plate to be obtained by the present invention.

According to the present invention, particles 20 may be dispersed on the material of resist. As shown in FIG. 11, after developing, the particles 20 are exposed on the inclined faces to form fine convex portions 20a. In addition, if the particles 20 are eliminated by a method such as dissolution or another method in the development step, fine concave portions 21 each corresponding to the diameter of micro particle 20 are formed on the inclined face 16a (or 16b) where the fine particles 20 have exposed.

This asperity can be controlled by appropriately controlling the diameter of particle, the concentration of particle, the uniformity of particle or the like. In order to improve the light diffuseness, it is preferable for the particle to comprise a spherical form or a form close to a spherical form. The concentration of particle can be adjusted by a ratio of component for the particle (mixture ratio).

As described above, for example, it is possible for the arithmetic mean roughness of inclined face to be within a range of about 0.1 μm-2 μm. Moreover, it is possible for the arithmetic mean roughness to be within a range of 0.15 μm-1.5 μm; furthermore, it is possible for the arithmetic mean roughness to be within a range of 0.2 μm-1 μm. Accordingly the asperity having excellent uniformity can be formed.

Generally, the shape of asperity which is formed as described above is about less than half of the diameter of particle 20. Accordingly, the asperity formed by eliminating the particles can be set to a desired arithmetic mean roughness within a range of about 0.1 μm-2 μm by setting the particle diameter of particle 20 within a range of 0.1 μm-5 μm, for example. Therefore, the light guide plate having the diffuseness on the inclined face 2b can be obtained as shown in FIG. 4(c).

Moreover, according to the present invention, it is preferable for the particles to be uniformly dispersed with respect to the dispersion liquid. By uniformly dispersing the particles, the asperity on the surface of original plate to be obtained can be equally obtained. In order to uniformly disperse the particles in the dispersion liquid, it is possible to disperse by means of agitating or the like such as a homogenizer or a mixer; however, it is not limited thereto, it can be appropriately selected.

A simple method of eliminating the fine particles 20 is to disperse the particles in the positive resist by using the negative resist as a sea component. The positive resist as the particle is dissolved by exposing, so the positive resist exposed on the inclined face is eliminated in the development step. Therefore, the micro structure having the fine concave portions 21 on the inclined face can be obtained.

Such dispersion liquid select positive photoresist and negative photoresist which do not have compatibility each other, and can be formed in accordance with an ordinary method of forming emulsion such as a method of swiftly discharging a small amount of component by using a reduced diameter nozzle.

In this case, it is preferable for the obtained dispersion liquid to uniformly disperse the diameter of particle as much as possible via a defoaming process.

Next, the photomask 13 is not limited as long as it comprises the slits 13b each having a desired shape. However, generally, it is better to use the thin photomask 13. If the thick photomask 13 is used, the reflection by the side face of the slit 13 becomes an issue. In this case, it is preferable for the side face of slit 13 to comprise at least a light-absorbing material. Moreover, it is preferable for the side having contact with the resist layer 12 to have an appropriate releasing performance or to be applied with appropriate releasing agent. Accordingly, the separation from the resist layer 12 is easily performed after exposing.

Next, as the light source, a light source corresponding to a resist material to be used can be used. When using photoresist, a normal ultraviolet source can be directly used. The adjustment of incident angle is achieved by moving the light source (including the change in the irradiation angle) or changing the angle of substrate 11.

According to the present invention, it is characterized by irradiating the light ray while changing the angle of light ray from the slit 13b in a continuous manner or in a phased manner, and UV exposure is performed in a preferred embodiment. A desired shape can be therefore obtained while controlling a deformation volume without having influence of heat and temperature. In addition, since the master plate can be manufacture by a simple device, compared with SR light, the cost can be held down.

The obtained microstructure can be directly used as the master plate or can be used as the master plate after an appropriate process. One example of such a process is a reasonable heating process. By conducting the reasonable heating process, the shape of peaked leading end can be smoothened.

The obtained master plate can be used as the stampa by an ordinary method. For example, a conductive film is formed on the surface of master plate, an electrocasting layer is formed on the conductive film by electrocasting the electrocasting metal, and the micro structure is removed from the conductive film by a method of separating, dissolving or the like, so as to manufacture a stampa for molding.

Of course, when using a conductive substrate as the substrate, electrodeposition can be performed, which soaks the conductive substrate in plating solution, by using the entire conductive substrate as an electrode.

In this case, for example, a nickel, metal, silver or copper, or more than one arbitrary alloy from a metal, silver, copper and nickel can be used as the above conductive film. In addition, for example, a copper, zinc or nickel, or more than one arbitrary alloy from a copper, zinc and nickel can be used as the electrocasting.

Moreover, a desired light guide plate can be manufactured with low costs by transferring micro asperity to a resin with the above stampa (metal mold) for molding.

As the transferring method, an injection molding, thermal pressing, casting method, transfer-forming or the like can be used, in addition to the method of transferring to a resin sheet a micro asperity formed on the surface of stampa for molding, but the method is not limited to these, and it can be appropriately selected.

EMBODIMENTS

Hereinafter, effects of the present invention will be explained in detail.

Embodiment 1

Negative photoresist (CA3000) manufactured by Tokyo Ohka Kogyo Co., Ltd. was applied to a clean glass, and the clean glass was cooled off to a room temperature after being heated for two minutes by a 110° C. hot plate. A photomask provided with slits at predetermined intervals was attached firmly to the glass substrate. While rotation from −45° to +45° was performed at a speed of 120 seconds, UV light was irradiated at 1400 mJ. After separating the photomask, the substrate was developed. In accordance with an ordinary method, a nickel conductive film was formed on the surface of the obtained master plate, and a nickel electrocasting layer was formed on this nickel conductive film by electrocasting a nickel as a metal for electrocasting. Moreover, the master plate was separated from the nickel conductive film, and a stampa I on the emission plane side provided with a pattern including trapezoidal shapes each having a height of 0.01 mm, a width of about 10 μm in the flat part on the apex portion and an inclined angle of 45°.

In addition, positive photoresist (AZP4400) manufactured by Clariant Japan Co., Ltd., was applied to a clean glass, and the clean glass was cooled to a room temperature after being heated for 90 minutes by a 90° C. hot plate. UV light was irradiated to a photomask at 250 mJ from the vertical direction in a state that the photomask provided with slits at predetermined intervals was separated from the resist surface of the glass substrate at 0.12 mm. After that, through the similar processes, a master plate provided with V-shape grooves (reflection grooves) each having a groove apex angle of 80° and a height of 0.01 mm at predetermined intervals was produced, and a stampa II on the bottom plane side was produced.

These stampa I and stampa II were incorporated to a cavity of metal mold fixed side and a cavity of metal mold movable side of an injection machine, respectively, as a transferring form. A light guide plate (8 mm thick) having a micro structure for a 17-inch display was obtained by an injection molding method.

The obtained light guide plate comprises the emission plane including trapezoidal convex portions in cross-section and trapezoidal concave portions in cross-section and the bottom plane including grooves each having a V-shape in cross-section (V-shape groove). The shape of trapezoidal convex portion on the emission plane has a height H of 10 μm, a width W2 of the zenith portion of 10 μm and a width W3 of the bottom plane of 30 μm, and the shape of trapezoidal concave portion has a width W3 of the zenith portion of 3 μm, a height of the V-shape groove of bottom plane of 10 μm in and a zenith angle of 80°. In addition, the pitch was gradually adjusted from a cold-cathode tube side to a central portion from 150 μm to 30 μm.

As shown in FIG. 3, a pair of CCEL light sources each having a tube face brightness of 49000 cd/m² (constant) were disposed in the both ends of light guide plate on the right and left along the light incident end faces. A reflector was disposed in the back of each of the light sources. In addition, two diffusion sheets (trade name of D120) manufactured by TUJIDEN CO., Ltd. were disposed above the emission plane of light guide plate 1, the reflection sheet 5 (E60L manufactured by Toray Industries, Inc.) was disposed each of the bottom plane 7 and the reflection end planes 8*b*, and a backlight device was formed. The brightness performance of the backlight device as formed above was measured. The brightness was measured by using a brightness photometer manufactured by TOPCON CORPORATION (TOPCON BM-7) at a distance of 50 cm from the sample surface. Moreover, the ratio of minimum brightness to maximum brightness on the backlight plane was obtained as brightness irregularity. Furthermore, in the center point of the emission plane of light guide plate 1, angle distribution of brightness (hereinafter, referred to as horizontal direction angle brightness distribution) was measured while sequentially inclining the brightness photometer from the vertical direction of the emission plane to the both sides with respect to the each of the zenith planes orthogonal to the long side of trapezoidal convex pattern in cross-section and the long side of trapezoidal concave pattern in cross-section formed on the emission plane. Similarly, in the center point of emission plane of the light guide plate 1, angle distribution of brightness (hereinafter, referred to as vertical direction angle brightness distribution) was measured while sequentially inclining the brightness photometer from the vertical direction of the emission plane to the both sides with respect to the each of the planes which is parallel to the long side of trapezoidal convex pattern in cross-section and the long side of trapezoidal concave pattern in cross-section formed on the emission plane and is perpendicular to the light guide plate 1. A horizontal half-value angle and a vertical half-value angle which become indexes of viewing angle feature were obtained from the horizontal direction angle brightness distribution and the vertical direction angle brightness distribution.

As a result, the maximum brightness was 4987 cd/m², the brightness irregularity was 0.81, the horizontal half-value angle was 32.8° and the vertical half-value angle was 35.9°.

Embodiment 2

The embodiment 2 is a case that the side face portion 2*b* of trapezoidal prism in the embodiment 1 was adopted as the diffusion face. 35 g of silicone resin particles each having 2 μin diameter (Tospearl particle manufactured by GE Toshiba Silicones Co., Ltd.) was mixed with 200 ml of the negative resist in the embodiment 1. The mixture was agitated for 10 minutes by using a mixer type agitator, and dispersion liquid in which the silicone resin particles were uniformly dispersed was obtained by pressurizing and defoaming after mixing.

This dispersion liquid was applied to a clean glass, and the clean glass was cooled off to a room temperature after being heated for two minutes by a 110° C. hot plate. Negative resist was applied to the dispersion liquid, and a photomask provided with slits at predetermined intervals was attached firmly to the glass substrate. While rotation from −45 to +45° was performed at a speed of 120 seconds, UV light was irradiated at 1400 mJ.

After separating the photomask, the substrate was developed. In accordance with an ordinary method, a nickel conductive film was formed on the surface of the obtained master plate, and a nickel electrocasting layer was formed on this nickel conductive film by electrocasting a nickel as a metal for electrocasting. Moreover, the master plate was separated from the nickel conductive film, and a normal rotation form on the emission plane side provided with trapezoidal pattern each having a height of 0.01 mm, a width of the flat part on the apex portion of 10 μm and an inclined angle of 45° was produced. Furthermore, the nickel surface layer of normal rotation form was lightly oxygenated by an oxidation device such as an oxidization plasma ashing device, and a nickel electrocasting layer was formed on the normal rotation form by electrocasting a nickel as a metal for electrocasting. Furthermore, a reversed rotation form was separated from the normal rotation form, and a stampa I on the emission plane side provided with a pattern including trapezoidal shapes each having a height of 0.01 mm, a width of the flat part on the apex portion of about 10 μm, and an inclined angle of 45° was produced. The arithmetic mean roughness of the surface of trapezoidal pattern was measured by a surface roughness meter (Surfcom 200B manufactured by TOKYO SEIMITSU CO., LTD.), and the arithmetic mean roughness was 0.23 μm-0.25 μm. Moreover, through the processes similar to those in the embodiment 1, stampa II provided with V shape grooves (reflection grooves) each having a groove apex angle of 80° and a height of 0.01 mm was produced. After that, a light guide plate (8 mm thick) having a micro structure was obtained via the processes similar to those of the embodiment 1.

This light guide plate was incorporated into the backlight device identical to that of the embodiment 1, and the brightness performance was measured as in the case of the embodiment 1. The maximum brightness was 4720 cd/m², the brightness irregularity was 0.82, the horizontal half-value angle was 39° and the vertical half-value angle was 36°. The brightness irregularity was improved compared with the embodiment 1. Especially, the viewing angle characteristic of horizontal direction was improved. Moreover, glare on the light emitting surface was reduced.

Embodiment 3

The embodiment 3 is a case that the entire plane of trapezoidal prism in the embodiment 1 is adopted as the diffusion plane. 35 g of silicone resin particles each having 2 μm in diameter (Tospearl particle manufactured by GE Toshiba Silicones, Co., Ltd.) was mixed with 200 ml of the photoresist used in the embodiment 1. The mixture was agitated for 10 minutes by using a mixer type agitator, and dispersion liquid in which the silicone resin particles were uniformly dispersed was obtained by pressurizing and defoaming after mixing. This dispersion liquid was applied to a clean glass, and the clean glass was cooled off to a room temperature after being heated for two minutes by a 110° C. hot plate. A photomask provided with slits at predetermined intervals was attached firmly to the glass substrate. While rotation from −45° to +45° was performed at a speed of 120 seconds, UV light was irradiated at 1400 mJ. After separating the photomask, the substrate was developed. After developing, the surface of master plate was observed. The silicone resin particles were exposed on the inclined faces or were separated, and micro convex portions and concave portions were formed.

In accordance with an ordinary method, a nickel conductive film was formed on the surface of the obtained master plate, and a nickel electrocasting layer was formed on this nickel conductive film by electrocasting a nickel as a metal for electrocasting. Moreover, the master plate was separated from the nickel conductive film, and a stampa I on the emission plane side provided with a pattern having trapezoidal shapes each having a height of 0.01 mm, a width of the flat part on the apex portion of about 10 μm, and an inclined angle of 45° was produced. The arithmetic mean roughness of the surface of trapezoidal pattern was measured by a surface roughness meter (Surfcom 200B manufactured by TOKYO SEIMITSU CO., LTD.), and the arithmetic mean roughness was 0.23 μm-0.25 μm. Moreover, through the processes similar to these of the embodiment 1, stampa II provided with V shape grooves (reflection grooves) each having a groove apex angle of 80° and a height of 0.01 mm was formed.

After that, the light guide plate (8 mm thick) having the micro structure was obtained via the processes similar to these of the embodiment 1.

This light guide plate was incorporated into the backlight device identical to that of the embodiment 1, and the brightness performance was measured as in the case of the embodiment 1. The maximum brightness was 4640 cd/m$^2$, the brightness irregularity was 0.83, the horizontal half-value angle was 42° and the vertical half-value angle was 37°.

Compared with the embodiment 2, the maximum brightness was decreased, but the viewing angle characteristic was further improved. Moreover, the glare on the light emitting surface was reduced, and the dark line generated from the corner portion of light guide plate was solved.

Embodiment 4

The embodiment 4 is a case that the base angles a1, a2 of trapezoidal prism, the apex angle and the height of V-shape groove in the embodiment 1 are changed to 55°, 100° and 20 μm, respectively.

Negative photoresist (CA3000) manufactured by Tokyo Ohka Kogyo Co., Ltd. was applied to a clean glass, and the clean glass was cooled off to a room temperature after being heated for two minutes by a 110° C. hot plate. A photomask provided with slits at predetermined intervals was attached firmly to the glass substrate. While rotation from −35° to +35° was performed at a speed of 120 seconds, UV light was irradiated at 1400 mJ. After separating the photomask, the substrate was developed. In accordance with an ordinary method, a nickel conductive film was formed on the surface of the obtained master plate, and a nickel electrocasting layer was formed on this nickel conductive film by electrocasting a nickel as a metal for electrocasting. Moreover, the master plate was separated from the nickel conductive film, and a stampa I on the emission plane side provided with a pattern including trapezoidal shapes each having a height of 0.01 mm, a width of the flat part on the apex portion of about 10 μm and an inclined angle of 55° was obtained.

In addition, positive photoresist (AZP4400) manufactured by Clariant Japan Co., Ltd., was applied to a clean glass, and the clean glass was cooled off to a room temperature after being heated for 90 minutes by a 90° C. hot plate. UV light was irradiated to a photomask at 250 mJ from the vertical direction in a state that the photomask provided with slits at predetermined intervals was separated from the resist surface of the glass substrate at 0.15 mm. After that, through the similar processes, a master plate in which V-shape grooves (reflection grooves) each having a groove apex angle of 100° and a height of 0.02 mm were produced at predetermined intervals was produced, and a stampa II on the bottom plane side was produced.

These stampa I and stampa II were incorporated to a cavity of metal mold fixed side and a cavity of metal mold movable side of an injection molding machine, respectively, as transferring forms, and a light guide plate (8 mm thick) having the micro structure for a 17-inch display was obtained by an injection molding method.

The obtained light guide plate comprises the emission plane including the trapezoidal convex portions in cross-section and the trapezoidal concave portions in cross-section and the bottom plane including grooves each having a V-shape in cross-section (V-shape grooves). The shape of trapezoidal convex portion on the emission plane has a height H of 10 μm, a width W2 of the zenith portion of 10 μm and a width W1 of the bottom plane of 24 μm, and the shape of trapezoidal concave portion has a width W3 of the zenith portion of 3 μm, a height of the V-shape groove of bottom plane of 20 μm and a zenith angle of 100°. In addition, the pitch was gradually adjusted from a cold-cathode tube side to a central portion from 250 μm to 50 μm.

This light guide plate was incorporated into the backlight device identical to that of the embodiment 1, and the brightness performance was measured similar to the embodiment 1. The maximum brightness was 4917 cd/m$^2$, the brightness irregularity was 0.82, the horizontal half-value angle was 37.6° and the vertical half-value angle was 33.3°. Compared with, the embodiment 1, the horizontal half-value angle was increased and the viewing angle characteristic was improved while maintaining the brightness performance.

Embodiment 5

The embodiment 5 is a case that the base angles a1, a2 of trapezoidal prism, the apex angle and the height of V-groove in the embodiment 1 are changed to 40°, 100° and 10 μm, respectively. Negative photoresist (CA3000) manufactured by Tokyo Ohka Kogyo Co., Ltd. was applied to a clean glass, and the clean glass was cooled off to a room temperature after being heated for two minutes by a 110° C. hot plate. A photomask provided with slits at predetermined intervals was attached firmly to the glass substrate. While rotation from −50° to +50° was performed at a speed of 120 seconds, UV light was irradiated at 1400 mJ. After separating the photomask, the substrate was developed. A stampa was produced through the processes identical to those of the embodiment 1. The stampa I on the emission plane side was provided with a pattern including trapezoidal shapes each having a height of 0.01 mm, a width of a flat part on the apex portion of about 10 μm, and an inclined angle of 45°. Moreover, a stampa II on the bottom plane side was produced by the method similar to that of the embodiment I.

These stampa I and stampa II were incorporated to a cavity of metal mold fixed side and a cavity of metal mold movable side of an injection molding machine, respectively, as transferring forms, and a light guide plate (8 mm thick) having the micro structure for a 17-inch display was obtained by an injection molding method.

The obtained light guide plate comprises the emission plane including the trapezoidal convex portions in cross-section and the trapezoidal concave portions in cross-section and the bottom plane including the grooves each having a V-shape in cross-section (V-shape grooves). The shape of trapezoidal convex portion on the emission plane had a height H of 10 μm, a width W2 of the zenith portion of 10 μm and a width W1 of the bottom plane of 34 μm, and the shape of trapezoidal concave portion has a width W3 of the zenith portion of 3 μm, a height of the V-shape groove of bottom plane of 10 μm and a zenith angle of 100°. In addition, the pitch was gradually adjusted from a cold-cathode tube side to a central portion from 120 μm to 28 μm.

This light guide plate was incorporated into the backlight device identical to that of the embodiment 1, and the brightness performance was measured as in the case of the embodiment 1. The maximum brightness was 4859 cd/m², the brightness irregularity was 0.83, the horizontal half-value angle was 39.2° and the vertical half-value angle was 34.4°.

Compared with the embodiment 4, although the maximum brightness was slightly decreased, the horizontal half-value angle was increased and the viewing angle characteristic was improved.

Embodiment 6

The embodiment 6 is a case that the base angles a1, a2 of trapezoidal prism, the apex angle and the height of V-groove in the embodiment 1 are changed to 30°, 100° and 10 μm, respectively. Negative photoresist (CA3000) manufactured by Tokyo Ohka Kogyo Co., Ltd. was applied to a clean glass, and the clean glass was cooled off to a room temperature after being heated for two minutes by a 110° C. hot plate. A photomask provided with slits at predetermined intervals was attached firmly to the glass substrate. While rotation from −60° to +60° was performed at a speed of 120 seconds, UV light was irradiated at 1400 mJ. After separating the photomask, the substrate was developed. The stampa was produced through the processes identical to those in the embodiment 1. The stampa I on the emission plane side was provided with a pattern including trapezoidal shapes each having a height of 0.01 mm, a width of the flat part on the apex portion of about 10 μm and an inclined angle of 30°. Moreover, a stampa II on the bottom plane side was produced by the method similar to that of the embodiment I.

These stampa I and stampa II were incorporated to a cavity of metal mold fixed side and a cavity of metal mold movable side of an injection molding machine, respectively, as transferring forms, and a light guide plate (8 mm thick) having the micro structure for a 17-inch display was obtained by an injection molding method.

The obtained light guide plate comprises the emission plane including the trapezoidal convex portions in cross-section and the trapezoidal concave portions in cross-section and the bottom plane including the grooves each having a V-shape in cross-section (V-shape grooves). The shape of trapezoidal convex portion on the emission plane has a height H of 10 μm, a width W2 of zenith portion of 10 μm and a width W1 of bottom plane of 45 μm, and the shape of trapezoidal concave portion has a width W3 of zenith portion of 3 μm, a height of V-shape groove of bottom plane of 10 μm and a zenith angle of 100°. In addition, the pitch was gradually adjusted from a cold-cathode tube side to a central portion from 120 μm to 28 μm.

This light guide plate was incorporated into the backlight device identical to that of the embodiment 1, and the brightness performance was measured as in the case of the embodiment 1. The maximum brightness was 4572 cd/m², the brightness irregularity was 0.82, the horizontal half-value angle was 41.2° and the vertical half-value angle was 35.5°.

Compared with the embodiment 4, although the maximum brightness was decreased, the horizontal half-value angle was increased and the viewing angle characteristic was improved.

Embodiment 7

The embodiment 7 is a case that the base angles a1, a2 of trapezoidal prism, the apex angle and the height of V-groove of in the embodiment 1 are changed to 15°, 100° and 10 μm, respectively. Negative photoresist (CA3000) manufactured by Tokyo Ohka Kogyo Co., Ltd. was applied to a clean glass, and the clean glass was cooled off to a room temperature after being heated for two minutes by a 110° C. hot plate. A photomask provided with slits at predetermined intervals was attached firmly to the glass substrate. While rotation from −75° to +75° was performed at a speed of 120 seconds, UV light was irradiated at 1400 mJ. After separating the photomask, the substrate was developed. After that, a stampa was produced through the processes identical to those in the embodiment 1. The produced stampa I on the emission plane side was provided with a pattern including trapezoidal shapes each having a height of 0.01 mm, a width of the flat part on the apex portion of about 10 μm and an inclined angle of 45°. Moreover, a stampa II on the bottom plane side was produced by the method similar to that of the embodiment I.

These stampa I and stampa II were incorporated to a cavity of metal mold fixed side and a cavity of metal mold movable side of an injection molding machine, respectively, as transferring forms, and a light guide plate (8 mm thick) having the micro structure for a 17-inch display was obtained by an injection molding method.

The obtained light guide plate comprises the emission plane including the trapezoidal convex portions in cross-section and the trapezoidal concave portions in cross-section and the bottom plane including grooves each having a V-shape in cross-section (V-shape grooves). The shape of trapezoidal convex portion on the emission plane has a height H of 10 μm, a width W2 of the zenith portion of 10 μm and a width W1 of the bottom plane of 85 μm, and the shape of trapezoidal concave portion has a width W3 of the zenith portion of 3 μm, a height of the V-shape groove of bottom plane of 10 μm and a zenith angle of 100°. In addition, the pitch was gradually adjusted from a cold-cathode tube side to a central portion from 120 μm to 28 μm.

This light guide plate was incorporated into the backlight device identical to that of the embodiment 1, and the brightness performance was measured as in the case of the embodiment 1. The maximum brightness was 4317 cd/m², the brightness irregularity was 0.79, the horizontal half-value angle was 44.1° and the vertical half-value angle was 37.8°. Compared with the embodiment 4, although the maximum brightness was decreased, the horizontal half-value angle was increased and the viewing angle characteristic was improved.

Embodiment 8

The embodiment 8 is a case that the thickness of light guide plate in the embodiment 4 is changed to 6 mm. A stampa I on the emission plane side provided with a pattern including trapezoidal shapes each having a height of 0.01 mm, a width of the flat part on the apex portion of about 10 μm and an inclined angle of 55° was produced by the method similar to that of the embodiment 4. A stampa II on the bottom plane side provided with V-shape grooves in cross-section (each having a height of 20 μm, an apex angle of 100° and a pitch which gradually adjusted from a cold cathode tube side to a central portion from 350 μm to 50 μm) was produced by the method similar to that of the embodiment 1

These stampa I and stampa II were incorporated to a cavity of metal mold fixed side and a cavity of metal mold movable side of an injection molding machine, respectively, as transferring forms, and a light guide plate, which has 6 mm thick and the micro structure, for a 17-inch display was obtained by an injection molding method.

As shown in FIG. 3, a pair of CCFL light sources each having a tube face brightness of 49000 cd/m² (constant) were disposed in the both ends of light guide plate on the right and left along the light incident end faces. A reflector was disposed in the back of each light source. In addition, two diffusion sheets (trade name of D120) manufactured by TUJIDEN CO., Ltd. were disposed above the emission plane of light guide plate 1, the reflection sheet 5 (E60L manufactured by Toray Industries, Inc.) was disposed each of the bottom plane 7 and the reflection end planes 8$b$, and a backlight device was formed. Similar optical measurement of the backlight device 2 as formed above was performed by the measurement device similar to that of the embodiment 1. The maximum brightness was 4500 cd/m², the brightness irregularity was 0.81, the horizontal half-value angle was 37.9° and the vertical half-value angle was 34°.

Comparative Example 1

The comparative example is a case that the bottom angles a1, a2 of trapezoidal prism, the apex angle and the height of V-shape groove in the embodiment 1 are changed to 10°, 100° and 10 μm, respectively. Negative photoresist (CA3000) manufactured by Tokyo Ohka Kogyo Co., Ltd. was applied to a clean glass, and the clean glass was cooled off to a room temperature after being heated for two minutes by a 110° C. hot plate. A photomask provided with slits at predetermined intervals was attached firmly to the glass substrate. While rotation from −80° to +80° was performed at a speed of 120 seconds, UV light was irradiated at 1400 mJ. After separating the photomask, the substrate was developed. After that, a stampa was produced through the processes identical to those in the embodiment 1. The produced stampa I on the emission plane side was provided with a pattern including trapezoidal shapes each having a height of 0.01 mm, a width of the flat part on the apex portion of about 10 μm and an inclined angle of 10°. Moreover, a stampa II on the bottom plane side was produced by the method similar to that of the embodiment I.

These stampa I and stampa II were incorporated to a cavity of metal mold fixed side and a cavity of metal mold movable side of an injection molding machine, respectively, as transferring forms, and a light guide plate (8 mm thick) having the micro structure for a 17-inch display was produced by an injection molding method.

The obtained light guide plate comprises the emission plane including the trapezoidal convex portions in cross-section and the trapezoidal concave portions in cross-section and the bottom plane including grooves each having a V-shape in cross-section (V-shape grooves). The shape of trapezoidal convex portion on the emission plane has a height H of 10 μm, a width W2 of the zenith portion of 10 μm and a width W1 of the bottom plane of 123 μm, and the shape of trapezoidal concave portion has a width W3 of the zenith portion of 3 μm, a height of V-shape groove of bottom plane of 10 μm and a zenith angle of 100°. In addition, the pitch was gradually adjusted from a cold-cathode tube side to a central portion from 120 μm to 28 μm.

This light guide plate was incorporated into the backlight device identical to that of the embodiment 1, and the brightness performance was measured similar as in the case of the embodiment 1. The maximum brightness was 3860 cd/m², the brightness irregularity was 0.78, the horizontal half-value angle was 43.3° and the vertical half-value angle was 38.3°. Compared with the embodiment 4, the maximum brightness was significantly decreased, and the performance as the surface illuminant was reduced.

Comparative Example 2

The comparative example 2 is a case that a light guide plate is produced by applying printing dots on a flat bottom plane (8 mm thick) made of PMMA, and two diffusion sheets and two prism sheets are provide in the flat part on the emission plane side of the light guide plate.

White printed dots having crude density were provided in the bottom plane of light guide plate such that the density of printed dots was increased with increasing distance from the light incident end faces (high density of dots in the central portion of light guide plate), and predetermined brightness was distributed. A light source was disposed in each end of the light guide plate on the right and left along the light incident end faces. The reflector 4$b$ is disposed in the back of each light source. One prism sheet (BEFII manufactured by Sumitomo 3M Ltd.) was disposed above the emission plane of light guide plate, such that the groove allays became substantially parallel to the incident end faces. Moreover, a diffusion sheet was disposed thereabove, and a reflection sheet 5 (E60L manufactured by Toray Industries, Inc.) was disposed each of the bottom plane and the reflection end planes. The backlight device was formed. The brightness performance of the backlight device as formed above was measured. The maximum brightness was 5012 cd/m², the brightness irregularity was 0.76, the horizontal half-value angle was 42° and the vertical half-value angle was 38°.

Comparative Example 3

The comparative example 3 is a case of a prism light guide plate having a pattern that prisms are continuously disposed on the emission plane, and V-shape grooves on the bottom plane. A master plate provided with V-shape reflection grooves (80° groove apex angle and 0.33 mm high) at predetermined intervals was produced by a method similar to that of the embodiment 1, and a stampa II for the bottom plane side was produced.

On the other hand, the V-shape grooves having an apex angle of 90° and a height of 0.05 mm were directly produced in a metal mold by a cutting process with a diamond turning tool, and a nickel electrocasting layer was formed by directly electrocasting from the cut insert. A stampa I for the emission plane side provided with a pattern including prisms each having a height of 0.05 mm and an apex angle of 90° was obtained by separating the master plate.

By using these stampas as transferring forms, a light guide plate (8 mm thick) having the micro structure was obtained by the injection molding method similar to that of the embodiment 1.

Two diffusion sheets were placed on the emission plane of the obtained light guide plate, and the backlight device similar to that of the embodiment 1 was assembled.

The brightness performance was measured as in the case of the embodiment 1. The maximum brightness was 4957 cd/m² and the brightness irregularity was 0.75.

Figure 12:
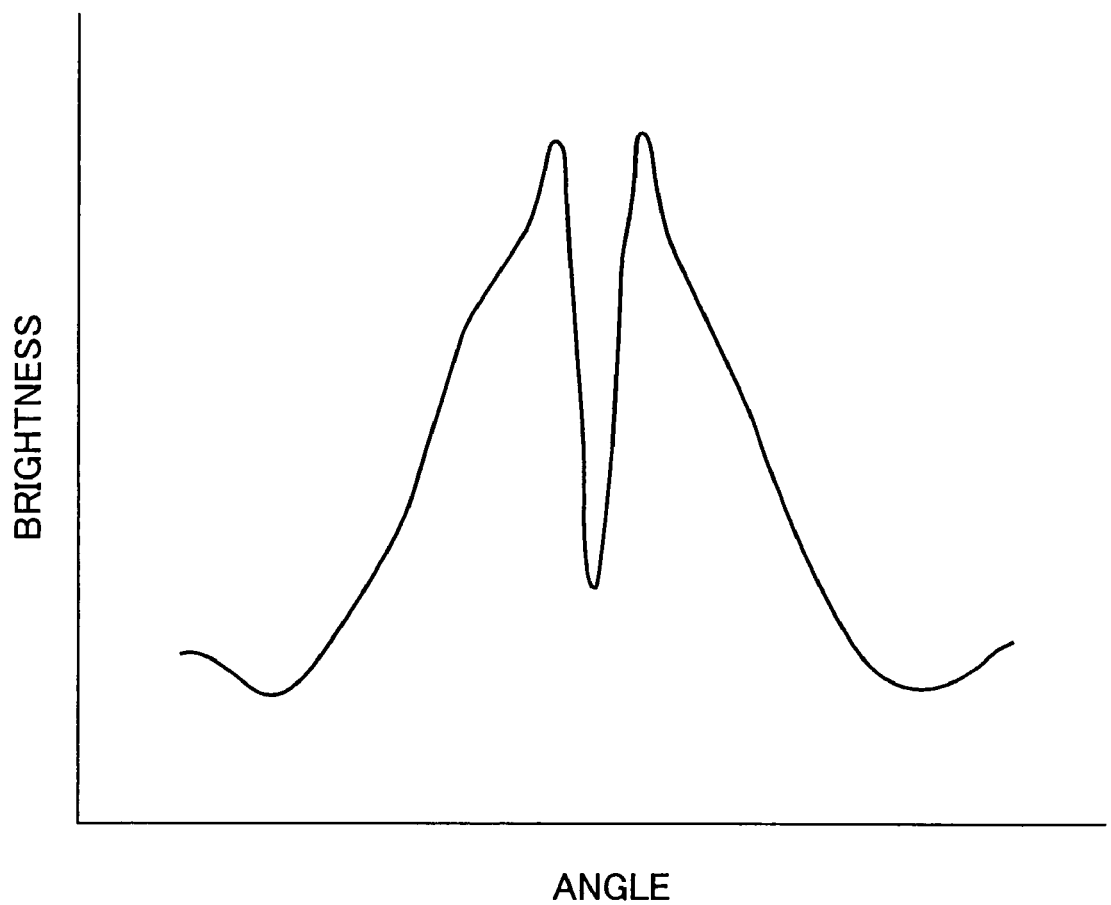
FIG. 12 A view showing angle distribution of brightness in a central portion of light guide plate in a comparative example 3.

In the backlight device in the comparative example 3, the angular distribution of brightness in the stand-alone light guide plate was measured. The brightness in the vertical direction was decreased as shown in FIG. 12. This is because the prisms each having an apex angle of 90° are continuously disposed, and the light which emits in the vertical direction is rarely met.

In order to solve this for improving the brightness in the vertical direction, it is necessary to use two diffusion sheets. However, since a luminous flux is used for solving this, the viewing angle is narrowed. The horizontal half-value angle was 30.5° and the vertical half-angle was 34.5°, which were narrowed compared with the embodiment 1.

Comparative Example 4

The comparative example 4 is a case that a light guide plate is produced by applying white printing dots having crude density on a flat bottom plane (6 mm thick) made of PMMA such that the density of printed dots is increased with increasing distance from the light incident end faces, and two diffusion sheets and one prism sheet are placed on the flat part of the emission plane side of the light guide plate. The light guide plate was set to the back light device 2 similar to that of the embodiment 8, and the optical measurement was performed by the measuring device similar to that of the embodiment 1. The maximum brightness was 4471 cd/m$^2$, the brightness irregularly was 0.78, the horizontal half-angle was 42° and the vertical half-angle was 33.5°.

Although the present invention has been described in terms of exemplary embodiment, a specific structure is not limited thereto. It should be appreciated that variations may be made in the embodiment without departing from the scope of the present invention.

For example, there has been explained that the light guide plate has substantially equal thickness, and the emission plane and the bottom plane are substantially parallel. However, it is not necessary for the emission plane and the bottom plane of light guide plate to be parallel. The thickness thereof may be gradually decreased with increasing the distance from the incident end plane as in the case of the general light guide plate.

Similarly, the upper base of trapezoid as a projection may be parallel to the bottom plane, or may inclines.

INDUSTRIAL APPLICABILITY

According to the light guide plate of the present invention, it can be suitably used for a surface illuminant device because the viewing angle can be increased and the deterioration in the surface quality can be prevented. In addition, the surface illuminant device including the light guide plate of the present invention comprises an edge-light type, so it is expected to be applied not only to a laptop computer provided with a liquid crystal backlight device but also to various thin display devices such as a monitor device, an illumination advertisement and a traffic sign.

The invention claimed is:

1. A light guide plate for an edge-light surface illuminant device, comprising: an emission plane; a bottom plane facing the emission plane; and
an incident end face which enters light emitted from a primary light source provided at least in one side face, wherein
the emission plane comprises a pattern having convex portions and concave portions formed at predetermined pitches;
the bottom plane comprises the pattern having the convex portions and/or the concave portions formed at predetermined pitches;
the pattern formed on the emission plane is orthogonal to the incident end face and the pattern formed on the bottom plane is parallel to the incident end face;
in the emission plane, in order to increase a viewing angle without reducing brightness in a vertical direction, each of the convex portions comprises a trapezoidal shape and each of the concave portions comprises a trapezoidal shape, and each of the convex portions having the trapezoidal shape and each of the concave portions having the trapezoidal shape are alternately arranged;
an inclined angle between an inclined face of the trapezoidal convex portion and the trapezoidal concave portion and the emission plane is within a range of 30°-60°; and
the incident end face is provided in one side face or in opposing side faces.

2. The light guide plate according to claim 1, wherein the convex portion having the trapezoidal shape formed on the emission plane has a height within a range of 1 μm-100 μm and a width of an upper base within a range of 1 μm-500 μm.

3. The light guide plate according to claim 2, wherein the concave portion having the trapezoidal shape formed on the emission plane has a width of an upper base within a range of 0.1 μm-500 μm and a ratio of the width of the upper base formed in the concave portion to the width of the upper base formed in the convex portion within a range of 0.01-200.

4. The light guide plate according to claim 1, wherein at least one surface of an upper base and an inclined face of the convex portion having the trapezoidal shape is roughened.

5. The light guide plate according to claim 4, wherein a surface roughness (arithmetic mean roughness) of the roughened face is within a range of 0.1 μm-10 μm.

6. The light guide plate according to claim 1, wherein the inclined face of the convex portion having the trapezoidal shape is roughened.

7. The light guide plate according to claim 6, wherein a surface roughness (arithmetic mean roughness) of the roughened face is within a range of 0.1 μm-10 μm.

8. The light guide plate according to claim 1, wherein the concave portions of the bottom plane comprises V-shape grooves formed at predetermined intervals.

9. The light guide plate according to claim 8, wherein each of the V-shape grooves of the bottom plane has a height within a range of 1 μm-100 μm and an apex angle within a range of 60°-120°.

10. The light guide plate according to claim 1, wherein the light guide plate is configured such that the emission plane and the bottom plane are integrally molded by injection molding with a transparent resin.

11. A method of manufacturing the light guide plate according to claim 1, the method comprising:
forming light illumination portions each having a substantially trapezoidal shape in cross-section and non-light illumination portions each having a substantially trapezoidal shape in cross-section by irradiating a parallel light ray from a light source via a photomask having slits opened at predetermined pitches relative to a resist layer formed on the substrate, while changing an angle from one direction to the other direction in a continuous manner and a phased manner with respect to a vertical plane along a longitudinal direction of each of the slits; and
obtaining the light guide plate comprising the alternately disposed convex portion and the concave portion which are formed based on each of the light illumination portions and each of the non-light illumination portions by developing the resist layer, yielding the light guide plate.

12. A light guide plate for a liquid crystal display comprising the light guide plate for an edge-light surface illuminant device, including: an emission plane; a bottom plane facing the emission plane; and an incident end face which enters light emitted from a primary light source provided at least in one side face, wherein the emission plane comprises a pattern having convex portions and concave portions formed at predetermined pitches;

the bottom plane comprises the pattern having the concave portions formed at predetermined pitches;

the pattern formed on the emission plane is orthogonal to the incident end face and the pattern formed on the bottom plane is parallel to the incident end face, in the emission plane, in order to increase a viewing angle without reducing brightness in a vertical direction, each of the convex portions comprises a trapezoidal shape and each of the concave portions comprises a trapezoidal shape, and each of the convex portions having the trapezoidal shape and each of the concave portions having the trapezoidal shape are alternately arranged;

an inclined angle between an inclined face of the trapezoidal convex portion and the trapezoidal concave portion and the emission plane is within a range of 30°-60°; and the incident end face is provided in one side face or opposing side faces.

13. A surface illuminant device, comprising: a light guide plate for an edge-light surface illuminant device, including: an emission plane; a bottom plane facing the emission plane; and an incident end face which enters light emitted from a primary light source provided at least in one side face, wherein the emission plane comprises a pattern having convex portions and concave portions formed at predetermined pitches, the bottom plane comprises the pattern having the concave portions formed at predetermined pitches, the pattern formed on the emission plane is orthogonal to the incident end face and the pattern formed on the bottom plane is parallel to the incident end face, and in the emission plane, in order to increase a viewing angle without reducing brightness in a vertical direction, each of the convex portions comprises a trapezoidal shape and each of the concave portions comprises a trapezoidal shape, and each of the convex portions having the trapezoidal shape~ each of the concave portions having the trapezoidal shape are alternately arranged, an inclined angle between an inclined face of the trapezoidal convex portion and the trapezoidal concave portion and the emission plane is within a range of 30°-60°, and the incident end face is provided in one side face or opposing side faces;

a primary light source which is provided to face the incident end face of the light guide plate; and a reflection sheet which is provided to face the bottom plane of the light guide plate.

* * * * *